(12) United States Patent
Chen

(10) Patent No.: US 12,602,331 B2
(45) Date of Patent: Apr. 14, 2026

(54) MEMORY PAGE TABLES SHARING METHOD AND APPARATUS

(71) Applicant: HUAWEI TECHNOLOGIES CO., LTD., Shenzhen (CN)

(72) Inventor: Rujie Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/940,993

(22) Filed: Nov. 8, 2024

(65) Prior Publication Data

US 2025/0068569 A1 Feb. 27, 2025

Related U.S. Application Data

(63) Continuation of application No. PCT/CN2022/140908, filed on Dec. 22, 2022.

(30) Foreign Application Priority Data

May 10, 2022 (CN) .......................... 202210504344.0

(51) Int. Cl.
*G06F 12/1009* (2016.01)
*G06F 12/1072* (2016.01)
(52) U.S. Cl.
CPC ...... *G06F 12/1009* (2013.01); *G06F 12/1072* (2013.01)

(58) Field of Classification Search
CPC .......................... G06F 12/1009; G06F 12/1072
See application file for complete search history.

(56) References Cited

U.S. PATENT DOCUMENTS

| | | | | |
|---|---|---|---|---|
| 2014/0281255 A1* | 9/2014 | Duluk, Jr. ............. | | G06F 11/073 |
| | | | | 711/133 |
| 2017/0185526 A9 | 6/2017 | Duluk, Jr. et al. | | |
| 2017/0235491 A1 | 8/2017 | Duluk et al. | | |
| 2021/0286733 A1 | 9/2021 | Rao et al. | | |

FOREIGN PATENT DOCUMENTS

| | | |
|---|---|---|
| CN | 113590364 A | 11/2021 |
| CN | 114385516 A | 4/2022 |

* cited by examiner

*Primary Examiner* — Chie Yew

(57) ABSTRACT

Embodiments of this application disclose a memory sharing method and an apparatus. The method in embodiments of this application includes: A host side establishes a first memory page table via a shared virtual address management unit. The first memory page table includes mapping from a virtual address on the host side to a physical address on the host side. A first device side establishes a second memory page table via a shared virtual address agent unit. The second memory page table includes mapping from a virtual address on the first device side to a physical address on the first device side. An agent system memory management unit SMMU on the first device side updates the second memory page table based on the first memory page table, or the host side updates the first memory page table based on the second memory page table.

16 Claims, 18 Drawing Sheets

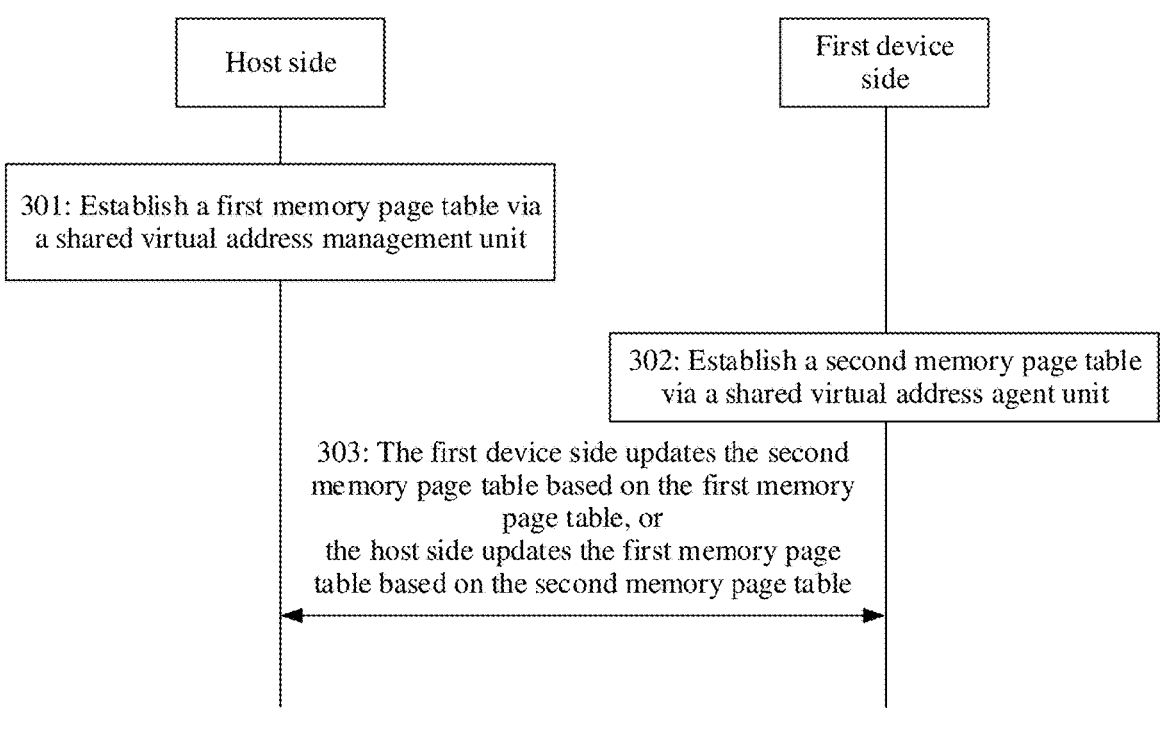

FIG. 3

Host side

First device side

401: Query a first memory page table based on a
first virtual address, to obtain a first physical address 402: Add mapping from the first virtual address to the
first physical address to a second memory page table 403: Query the second memory page table based on the
first virtual address, to obtain the first physical address 404: Access a memory on the host side based on the
first physical address

MEMORY PAGE TABLES SHARING METHOD AND APPARATUS

CROSS-REFERENCE TO RELATED APPLICATIONS

This application is a continuation of International Application No. PCT/CN2022/140908, filed on Dec. 22, 2022, which claims priority to Chinese Patent Application No. 202210504344.0, filed on May 10, 2022. The disclosures of the aforementioned applications are hereby incorporated by reference in their entireties.

TECHNICAL FIELD

Embodiments of this application relate to the computer field, and in particular, to a memory sharing method and an apparatus.

BACKGROUND

With development of artificial intelligence (artificial intelligence, AI) technologies, there is an increasing need for computing power of a host device. A general-purpose processor in the host device cannot meet a requirement of an artificial intelligence application yet. Therefore, a distributed heterogeneous system including the host device and a computing device supports a computing power requirement of the artificial intelligence application. For example, the host device sends a computing power-intensive task to an AI chip in the computing device for processing.

In the distributed heterogeneous system, a host side and a device side are connected through a PCIE bus, and the host side and the device side can access memory space of each other. When the host side accesses a memory on the device side through the PCIE bus, because physical addresses of memories on the host side and on the device side are isolated from each other, when the host side accesses a physical address of the memory on the device side, the host side needs to access an IO address reserved for a PCIe port. The PCIe port on the device side needs to perform an address translation via an address translation unit (ATU), in other words, translating the IO address to the physical address of the memory on the device side.

When the host side and the device side shares a memory, an IO address needs to be translated to a physical address of the memory. In an address translation process, a quantity of times of address processing is increased. This increases a data transmission delay between the host side and the device side. Consequently, a data transmission speed is slow during memory sharing.

SUMMARY

Embodiments of this application provide a memory sharing method and an apparatus, to improve a speed of memory access between devices in a heterogeneous system.

A first aspect of embodiments of this application provides a memory sharing method. The memory sharing method is used in a heterogeneous system. The method may be performed by a device in the heterogeneous system, or may be performed by a component of a device in the heterogeneous system, for example, a processor, a chip, or a chip system of the device. The method may alternatively be implemented by a logic module or software that can implement all or part of functions of the device. For example, the method is performed on a host side and a first device side in the heterogeneous system. The memory sharing method according to the first aspect includes the following steps: The host side establishes a first memory page table via a shared virtual address management unit. The first memory page table includes mapping from a virtual address on the host side to a physical address on the host side. The first device side establishes a second memory page table via a shared virtual address agent unit. The second memory page table includes mapping from a virtual address on the first device side to a physical address on the first device side. In the heterogeneous system, the physical address on the host side and the physical address on the first device side are physical addresses obtained through unified addressing. An agent system memory management unit SMMU on the first device side updates the second memory page table based on the first memory page table, or the host side updates the first memory page table based on the second memory page table.

In the heterogeneous system in this embodiment of this application, both the host side and the first device side can establish a local memory page table, and the memory page table on the host side and the memory page table on the first device side can be synchronized with each other. In this way, both the memory page table on the host side and the memory page table on the first device side include global mapping from a virtual address to a physical address in the heterogeneous system. In addition, both the host side and the first device side can query, in the local memory page tables, a physical address corresponding to a virtual address to be accessed. This improves a speed of memory access between devices in the heterogeneous system.

In a possible implementation, in a process in which the agent system memory management unit SMMU on the first device side updates the second memory page table based on the first memory page table, the agent SMMU on the first device side queries the first memory page table based on a first virtual address, to obtain a first physical address. The first virtual address is a virtual address to be accessed by the first device side, and the first physical address is a physical address on the host side. The first device side adds mapping from the first virtual address to the first physical address to the second memory page table.

In this embodiment of this application, the first device side can query the memory page table on the host side across devices via the agent SMMU, and add the address mapping in the memory page table on the host side to the memory page table on the first device side. In this way, address mapping in the memory page table on the first device side is updated based on the memory page table on the host side. This improves implementability of a solution of updating a memory page table.

In a possible implementation, after the first device side adds the mapping from the first virtual address to the first physical address to the second memory page table, when the first device side accesses the first virtual address again, the first device side queries the second memory page table on the first device side based on the first virtual address, to obtain the first physical address. The first device side accesses a memory on the host side based on the first physical address through a CPU bus.

In this embodiment of this application, the first device side adds the address mapping in the memory page table on the host side to the memory page table on the first device side. In this way, the first device side can directly query the memory page table on the first device side during a next access, without accessing the memory page table on the host side across devices. This improves efficiency of querying a memory page table.

In a possible implementation, in a process in which the host side updates the first memory page table based on the second memory page table, the first device side queries the second memory page table based on a second virtual address, to obtain a second physical address. The second physical address is a physical address on the first device side. The host side adds mapping from the second virtual address to the second physical address to the first memory page table.

In this embodiment of this application, the host side can query the memory page table on the first device side across devices, and add the address mapping in the memory page table on the first device side to the memory page table on host side. This updates the address mapping in the memory page table on the host side. This improves implementability of a solution.

In a possible implementation, before the first device side queries the second memory page table based on the second virtual address, the host side sends the second virtual address to the first device side. The second virtual address includes a virtual address uniformly allocated by the shared virtual address management unit on the host side. After the first device side receives the second virtual address, the first device side allocates a physical memory to the second virtual address, to obtain the second physical address. The first device side adds the mapping from the second virtual address to the second physical address to the second memory page table.

In this embodiment of this application, a host side device applies for a virtual address via the shared virtual address management unit, and sends the virtual address to the first device side. The first device side allocates a physical address for the virtual address. The host side may add, based on the physical address returned by the first device side, mapping from the virtual address to the physical address to the memory page table on the host side. This improves implementability of a solution of updating the memory page table on the host side.

In a possible implementation, after the host side adds the mapping from the second virtual address to the second physical address to the first memory page table, when the host side accesses the second virtual address again, the host side queries the first memory page table on the host side based on the second virtual address, to obtain the second physical address. The host side accesses a memory on the first device side based on the second physical address through a CPU bus.

In this embodiment of this application, the host side adds the address mapping in the memory page table on the first device side to the memory page table on the host side. In this way, the host side can directly query the memory page table on the host side during a next access. This improves efficiency of querying a memory page table, and further improves a memory access speed on the host side.

In a possible implementation, the heterogeneous system further includes a second device side. After the host side adds the mapping from the second virtual address to the second physical address to the first memory page table, an agent SMMU on the second device side updates a third memory page table based on the first memory page table. The first memory page table includes the mapping from the second virtual address to the second physical address. The second device side queries the third memory page table based on the second virtual address, to obtain the second physical address. The second device side accesses the memory on the first device side based on the second physical address.

In this embodiment of this application, the host side may synchronize the memory page table on the host side with that in a device side other than the first device side in the heterogeneous system. Because the memory page table on the host side is already synchronized with the memory page table on the first device side, another device in the heterogeneous system may access the physical address on the first device side by querying a local memory page table. This improves the speed of memory access between the devices in the heterogeneous system.

A second aspect of embodiments of this application provides a memory sharing method. The method may be performed by a device in a heterogeneous system, or may be performed by a component of a device in the heterogeneous system, for example, a processor, a chip, or a chip system of the device. The method may alternatively be implemented by a logic module or software that can implement all or part of functions of the device. For example, the method is performed on a host side and a first device side in the heterogeneous system. The memory sharing method according to the second aspect includes the following steps: The host side performs unified addressing on memory space of the heterogeneous system via a shared virtual address management unit, to obtain a memory page table. The memory page table includes mapping from a virtual address to a physical address in the heterogeneous system. When the first device side accesses a first virtual address in the heterogeneous system, a system management unit SMMU on the first device side queries the memory page table based on the first virtual address, to obtain a first physical address. The first physical address includes a physical address on the host side. The first device side accesses a memory on the host side based on the first physical address.

In this embodiment of this application, the host side performs unified addressing on the memory space of the heterogeneous system via the shared virtual address management unit. In addition, the system memory management unit on the first device side can directly access the memory page table on the host side, to implement translation from a virtual address to a physical address. The first device side can directly access a physical address on the host side through the CPU bus. This improves a speed of memory access across devices.

In a possible implementation, in a process in which the first device side queries the memory page table based on the first virtual address, the system memory management unit SMMU on the first device side sends the first virtual address to an agent SMMU on the first device side. The agent SMMU on the first device side queries the memory page table, to obtain the first physical address. The agent SMMU on the first device side sends the physical first physical address to the SMMU of a first device via a dispatch (dispatch) module.

In this embodiment of this application, the system memory management unit on the first device side may access the memory page table on the host side via the agent SMMU. In this way, a plurality of system memory management units on the first device side do not directly access the memory page table on the host side. In addition, the agent SMMU on the first device side may alternatively synchronize a returned physical address with that in the SMMU on the first device side. This improves a speed of memory access across devices.

In a possible implementation, after the host side performs unified addressing on memory space of the heterogeneous system via a shared virtual address management unit, the host side stores the memory page table on the first device side. Specifically, the host side sends the memory page table to the first device side.

In this embodiment of this application, after performing unified addressing on the memory space of the heterogeneous system to obtain the memory page table, the host side may send the memory page table to the first device side. When the page table is stored on the first device side, when accessing the memory page table, the first device side does not need to access the memory page table across chips. This improves efficiency of querying a memory page table.

A third aspect of embodiments of this application provides a memory sharing apparatus. The memory sharing apparatus includes a transceiver unit and a processing unit. The memory sharing apparatus is configured to perform the method performed on the host side according to any one of the first aspect or possible implementations of the first aspect, configured to perform the method performed on the first device side or a second device side according to any one of the first aspect or possible implementations of the first aspect, configured to perform the method performed on the host side according to any one of the second aspect or possible implementations of the second aspect, or configured to perform the method performed on the first device side or a second device side according to any one of the second aspect or possible implementations of the second aspect.

A fourth aspect of embodiments of this application provides an electronic device, including a processor. The processor is coupled to a storage. The processor is configured to store instructions. When the instructions are executed by the processor, the electronic device is enabled to perform the method performed on the host side according to any one of the first aspect or possible implementations of the first aspect, the electronic device is enabled to perform the method performed on the first device side or a second device side according to any one of the first aspect or possible implementations of the first aspect, the electronic device is enabled to perform the method performed on the host side according to any one of the second aspect or possible implementations of the second aspect, or the electronic device is enabled to perform the method performed on the first device side or a second device side according to any one of the second aspect or possible implementations of the second aspect.

A fifth aspect of embodiments of this application provides a heterogeneous system, including a host side and a device side. The host side includes a shared virtual address management unit. The device side includes a shared virtual address management agent unit and an agent system memory management unit. The host side is configured to perform the method performed on the host side according to any one of the first aspect or possible implementations of the first aspect. The device side is configured to perform the method performed on the first device side or a second device side according to any one of the first aspect or possible implementations of the first aspect.

A sixth aspect of embodiments of this application provides a heterogeneous system, including a host side and a device side. The host side includes a shared virtual address management unit. The device side includes an agent system memory management unit. The host side is configured to perform the method performed on the host side according to any one of the second aspect or possible implementations of the second aspect. The device side is configured to perform the method performed on the first device side according to any one of the second aspect or possible implementations of the second aspect.

A seventh aspect of embodiments of this application provides a heterogeneous system, including a host side and a device side. The host side includes a shared virtual address management unit. The device side includes a system memory management unit. The host side is configured to perform the method performed on the host side according to the second aspect. The device side is configured to perform the method performed on the first device side according to the second aspect.

An eighth aspect of embodiments of this application provides a computer-readable storage medium. The computer-readable storage medium stores instructions. When the instructions are executed, a computer is enabled to perform the method according to any one of the first aspect or possible implementations of the first aspect, or a computer is enabled to perform the method according to any one of the second aspect or possible implementations of the second aspect.

A ninth aspect of embodiments of this application provides a computer program product. The computer program product includes instructions. When the instructions are executed, a computer is enabled to perform the method according to any one of the first aspect or possible implementations of the first aspect, or a computer is enabled to perform the method according to any one of the second aspect or possible implementations of the second aspect.

It may be understood that for beneficial effects that can be achieved by any memory sharing apparatus, electronic device, heterogeneous system, computer-readable medium, computer program product, or the like provided above, refer to beneficial effects in the corresponding method. Details are not described herein again.

BRIEF DESCRIPTION OF DRAWINGS

FIG. 3 is a schematic flowchart of a memory sharing method according to an embodiment of this application;

FIG. 4a is a schematic flowchart of another memory sharing method according to an embodiment of this application;

DESCRIPTION OF EMBODIMENTS

Embodiments of this application provide a memory sharing method and an apparatus, to improve a speed of memory access in a heterogeneous system.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, in embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. To be precise, the word such as "example" or "for example" is intended to present a related concept in a specific manner.

In the following, some terms in this application are described, so as to help a person skilled in the art have a better understanding.

A heterogeneous system is a complete system including a plurality of processing units or subsystems of different architectures. For example, a central processing unit on a host side and an artificial intelligence (artificial intelligence, AI) chip on a device side have different architectures, and the host side and the device side form a heterogeneous system.

A central processing unit (central processing unit, CPU) bus means a bus through which the central processing unit CPU on the host side accesses address space of the AI chip on the device side. A signal transmitted through a CPU bus includes an address signal, a data signal, and a control signal.

The following describes a memory sharing method and an apparatus according to embodiments of this application with reference to the accompanying drawings.

Figure 1A:
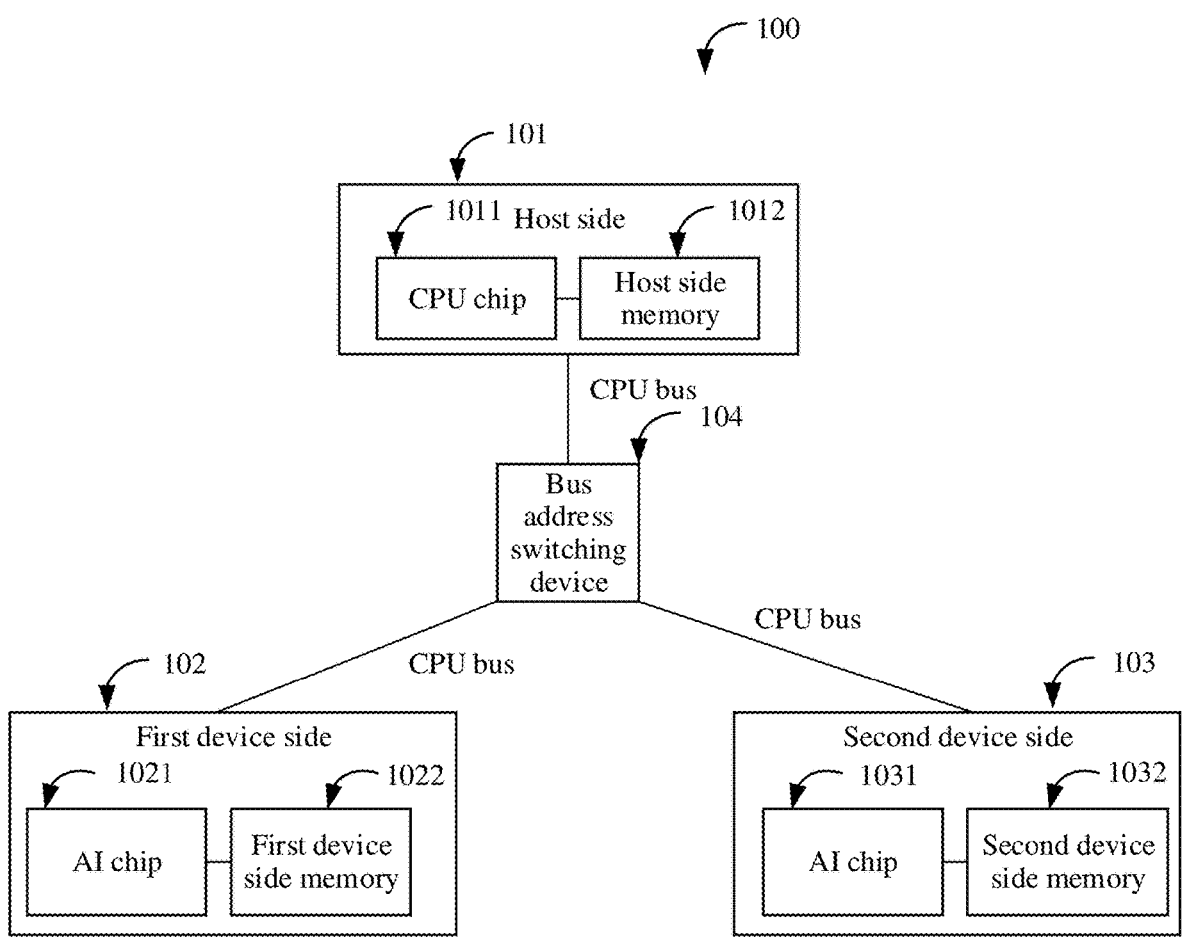
FIG. 1a is a schematic diagram of a system architecture of a heterogeneous system according to an embodiment of this application.

FIG. 1a is a schematic diagram of a system architecture of a heterogeneous system according to an embodiment of this application. As shown in FIG. 1a, a heterogeneous system 100 includes a host side 101, a first device side 102, a second device side 103, and a bus address switching device 104. The host side 101 is connected to the first device side 102 and the second device side 103 through the bus address switching device 104. The host side 101, the first device side 102, and the second device side 103 can access memory space of each other through CPU buses.

The following uses the heterogeneous system shown in FIG. 1a as an example to describe components of the heterogeneous system 100.

The host side 101 includes a CPU chip 1011 and a host side memory 1012. The CPU chip 1011 may access memory space of the first device side 102 and the second device side 103 through a CPU bus.

The first device side 102 includes an AI chip 1021 and a first device side memory 1022. The second device side 103 includes an AI chip 1031 and a second device side memory 1032. The AI chip 1021 and the AI chip 1031 may provide a capability of accelerated computing for AI application on the host side 101. For example, the host side 101 performs a model inference and training task via the AI chip 1021 and the AI chip 1031. In addition, the AI chip 1021 on the first device side 102 may directly access the host side memory 1012 and the second device side memory 1032 through the CPU buses.

The bus address switching device 104 is configured to forward, to a destination address based on address allocation in the heterogeneous system 100, an access request sent by the host side 101, the first device side 102, or the second device side 103.

It may be understood that the heterogeneous system 100 shown in FIG. 1a is only a heterogeneous system formed by the host side 101 and two device sides in an AI application scenario. In another example of this application, the host side 101 may be connected to a plurality of device sides through the bus address switching device 104. This is not specifically limited. In another scenario of this application, the AI chips on the first device side 102 and the second device side 103 may also be other processing chips. This is not specifically limited.

In the heterogeneous system 100, the host side memory 1012, the first device side memory 1022, and the second device side 1032 are memory space obtained through unified addressing. In other words, in this embodiment of this application, unified addressing needs to be performed on physical addresses of memories of all devices in the heterogeneous system 100 in advance. For a single device after unified addressing, address space on the device side includes address space of a local chip and address space across chips.

Figure 1B:
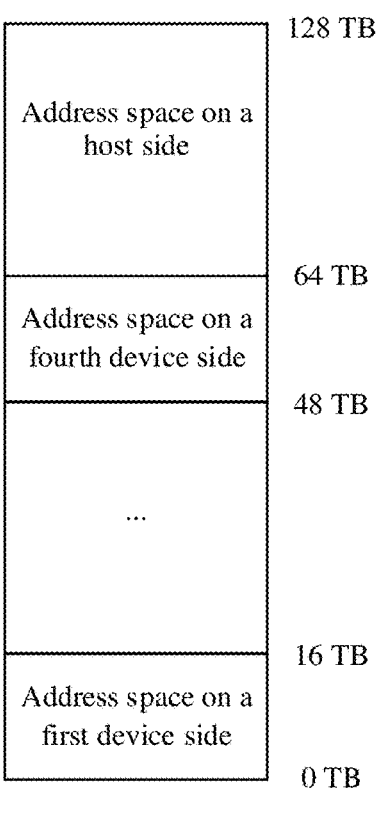
FIG. 1b is a schematic diagram of unified addressing of memory space of a heterogeneous system according to an embodiment of this application.

FIG. 1*b* is a schematic diagram of memory space that is of a heterogeneous system and that is obtained through unified addressing according to an embodiment of this application. As shown in FIG. 1*b*, a host, a first device, a second device, a third device, and a fourth device form a heterogeneous system. Access instructions of memory space of all devices in the heterogeneous system comply with a same instruction specification.

In the example shown in FIG. 1*b*, physical address space of the heterogeneous system is 128 TB. Because unified addressing is performed on a first device side, a second device side, a third device side, a fourth device, and a host side, the first device side, the second device side, the third device side, the fourth device, and the host side have consecutive physical addresses. For example, physical address space on the first device side is 0 TB to 16 TB, physical address space on the fourth device side is 48 TB to 64 TB, and physical address space on the host side is 64 TB to 128 TB.

Figure 1C:
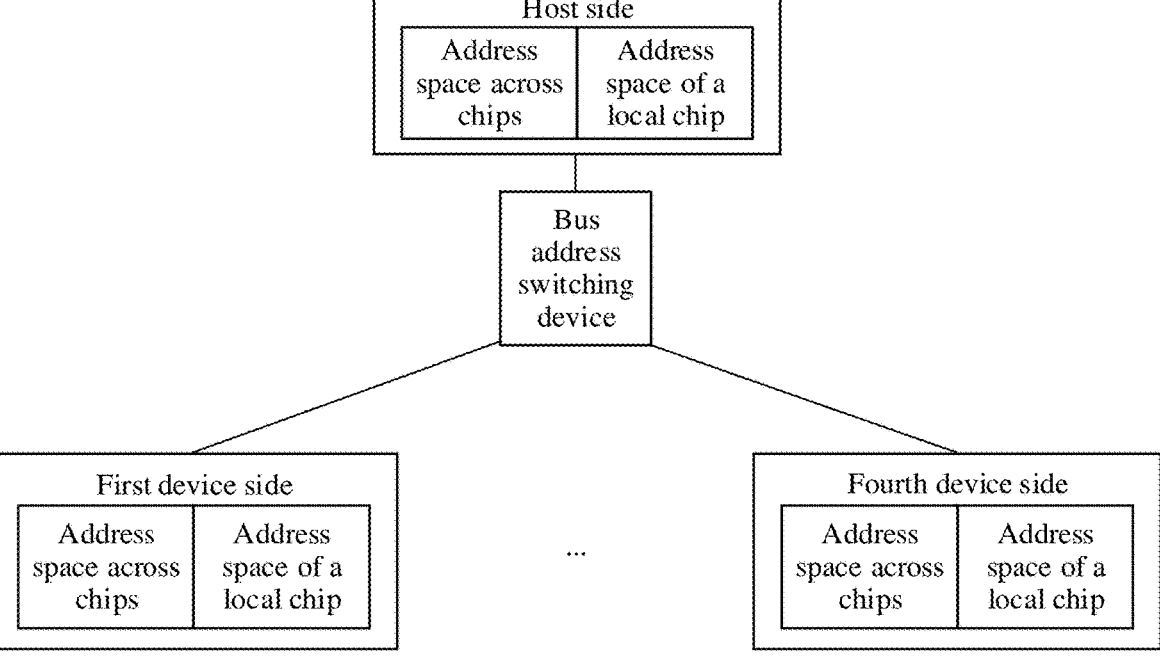
FIG. 1c is a schematic diagram of memory address space of a heterogeneous system according to an embodiment of this application.

FIG. 1*c* is a schematic diagram of address space that is of a heterogeneous system and that is obtained through unified addressing according to an embodiment of this application. In the example shown in FIG. 1*c*, each device in the heterogeneous system has address space in 128 TB address space, and each device includes address space of a local chip and address space across chips. Address space across devices is non-local physical address space.

In the heterogeneous system shown in FIG. 1*c*, unified addressing is performed on all devices in the heterogeneous system, and the devices are interconnected through CPU buses, so that the devices can directly access local memory space of each other through physical addresses. In actual application, application software on a host side is deployed on a virtual machine. For sake of security, memory access between devices is performed through a virtual address instead of a physical address. Therefore, shared virtual address management needs to be performed on a heterogeneous system, to implement memory access in the heterogeneous system through a virtual address.

The following describes in detail memory sharing methods according to embodiments of this application with reference to the accompanying drawings. Embodiments of this application provide three different memory sharing methods. A host side memory and a device side memory to which the three different memory sharing methods are applied have different internal structures. This is separately described as follows.

Figure 2A:
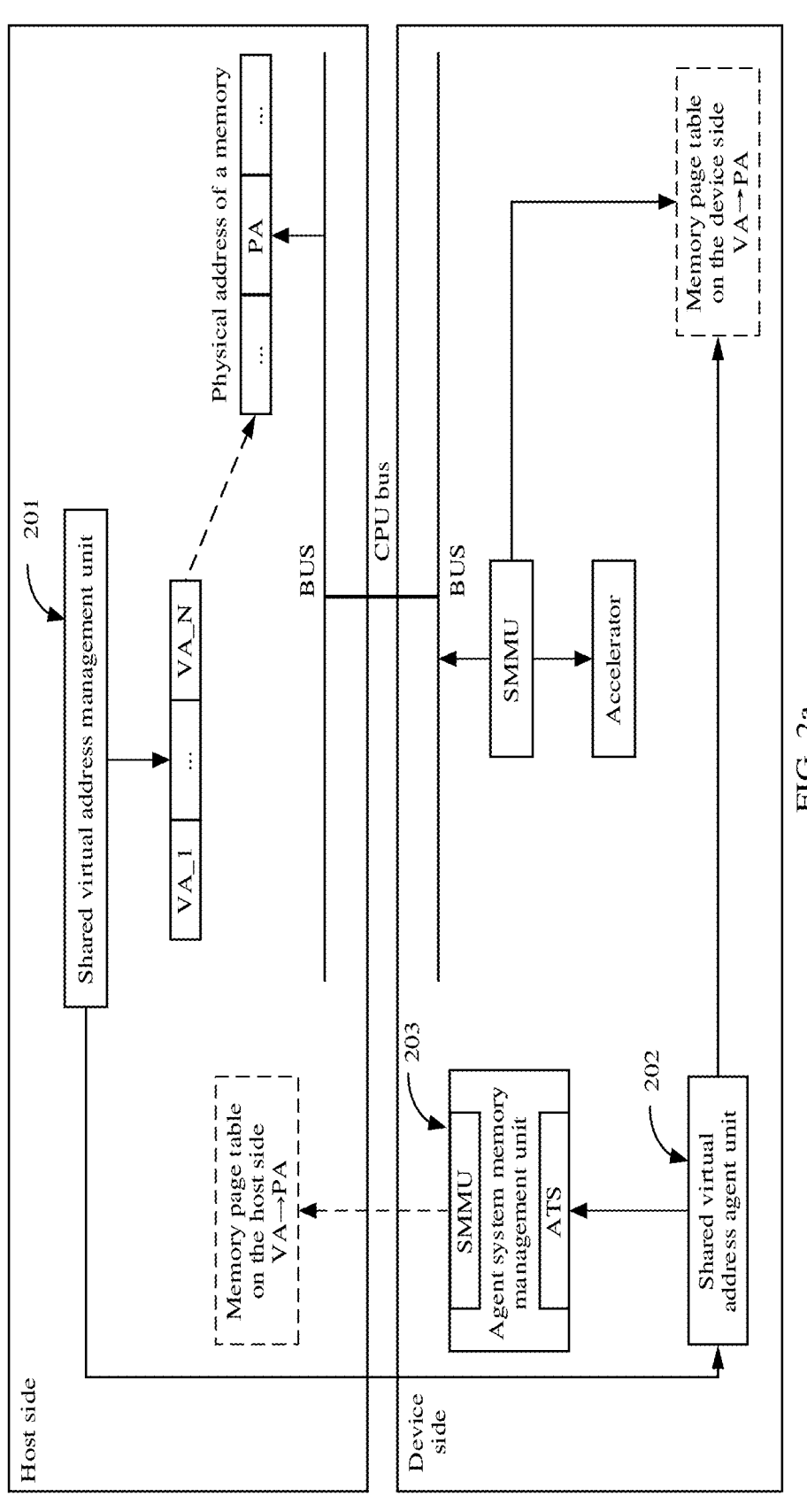
FIG. 2a is a schematic diagram of a system architecture of another heterogeneous system according to an embodiment of this application.

FIG. 2*a* is a schematic diagram of a system of a host side and a device side according to an embodiment of this application. In the heterogeneous system shown in FIG. 2*a*, the heterogeneous system mainly includes a shared virtual address management unit 201, a shared virtual address agent unit 202, and an agent system memory management unit 203. The shared virtual address management unit 201 is located on the host side of the heterogeneous system, and the shared virtual address agent unit 202 and the agent system memory management unit 203 are located on the device side of the heterogeneous system.

The shared virtual address management unit 201 on the host side is configured to perform a management operation on a virtual address in the heterogeneous system, including operations of applying for a virtual address and releasing a virtual address in the heterogeneous system. The shared virtual address management unit 201 is further configured to indicate the shared virtual address agent unit 202 on the device side to establish a memory page table on the device side.

The shared virtual address agent unit 202 on the device side is configured to create a device-side memory page table on the device side. The device-side page table includes a mapping relationship between a virtual address and a physical address of a memory on the device side.

The agent system memory management unit 203 on the device side includes a system memory management module SMMU and an address translation service ATS module. The memory management module SMMU is configured to manage entire memory space on the device side. The address translation service ATS module is configured to translate an address, so that the device side accesses a memory on the host side through a virtual address.

It should be noted that in the agent system memory management unit 203, an SMMU is a conversion module for converting an IO address of a device into a bus address, which is the same as a function of an SMMU module as defined in the ARM specification. The SMMU is also referred to as an IOMMU in an X86 system. The module accesses a memory page table, to query a physical address based on a virtual address. When the host side and the device side are interconnected through a CPU bus after the SMMU module in the agent SMMU performs unified addressing on the host side and the device side, software such as an operating system, boot software, or driver software on the host side can directly read and write address space of a register on the SMMU module, to initialize and configure hardware. An initialization and configuration procedure is the same as that in the SMMU in a hardware system on the host side. However, the SMMU module in the agent system memory management unit 203 is implemented on hardware on the first device side, and is not perceived by software.

Figure 2B:
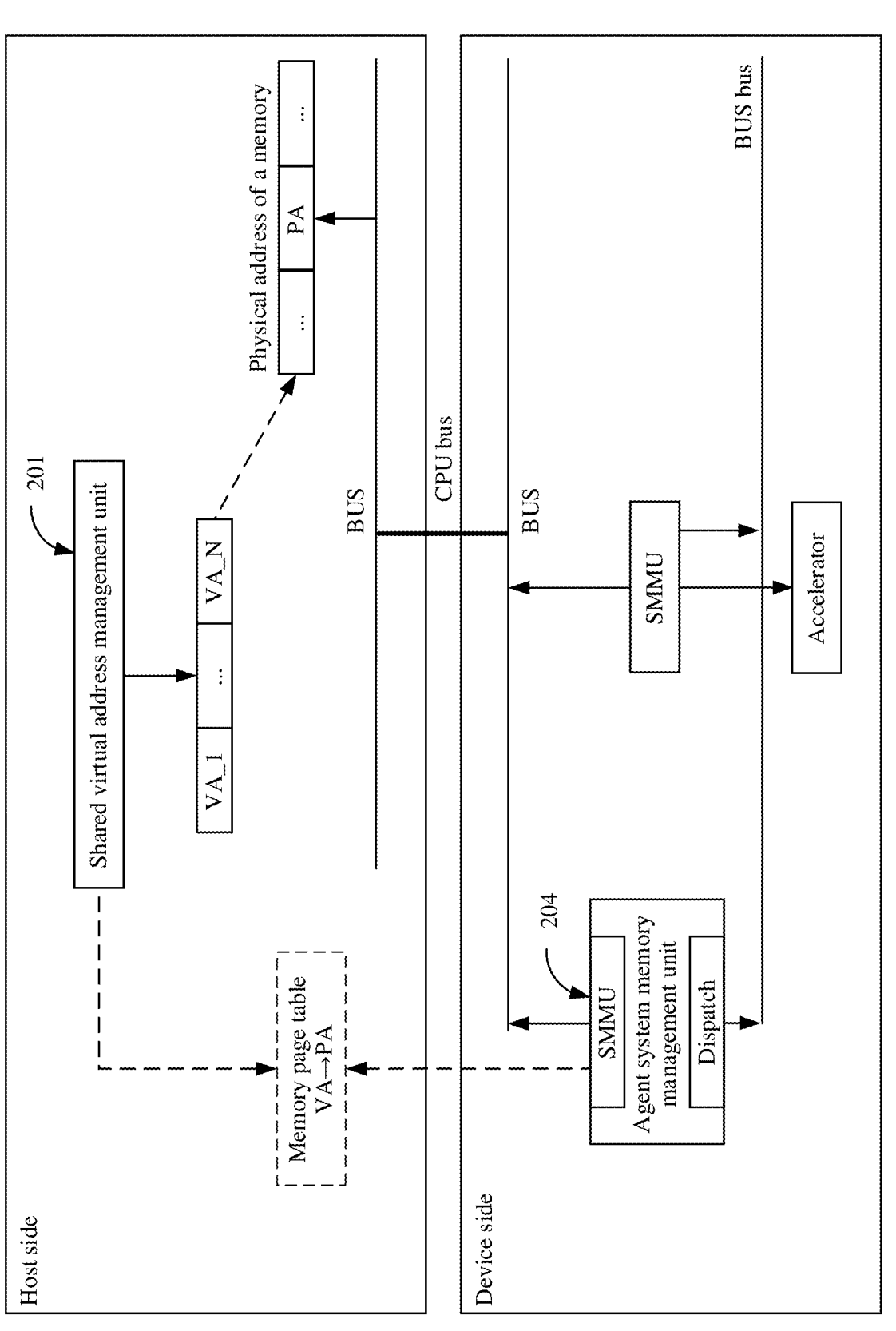
FIG. 2b is a schematic diagram of a system architecture of another heterogeneous system according to an embodiment of this application.

FIG. 2*b* is a schematic diagram of another system of a host side and a device side according to an embodiment of this application. In the example shown in FIG. 2*b*, compared with the heterogeneous system shown in FIG. 2*a*, a heterogeneous system shown in FIG. 2*b* mainly includes the shared virtual address management unit 201 and an agent system memory management unit 204. The agent system memory management unit 204 is different from the agent system memory management unit 203 in FIG. 2*a*.

The agent system memory management unit 204 includes a system memory management module SMMU and a dispatch (Dispatch) module. A memory management module SMMU is the same as the system memory management module SMMU of the agent system memory management unit 203 in FIG. 2*a*. The dispatch (Dispatch) module is configured to dispatch an operation command in a memory page table to another system memory management unit SMMU on the device side, and is further configured to forward an operation command in a memory page table of another SMMU on the device side to the SMMU in the agent SMMU, to execute an operation in a final memory page table. In the heterogeneous system shown in FIG. 2*b*, the memory page table may be located on the host side, or may be located on the device side. This is not specifically limited.

Figure 2C:
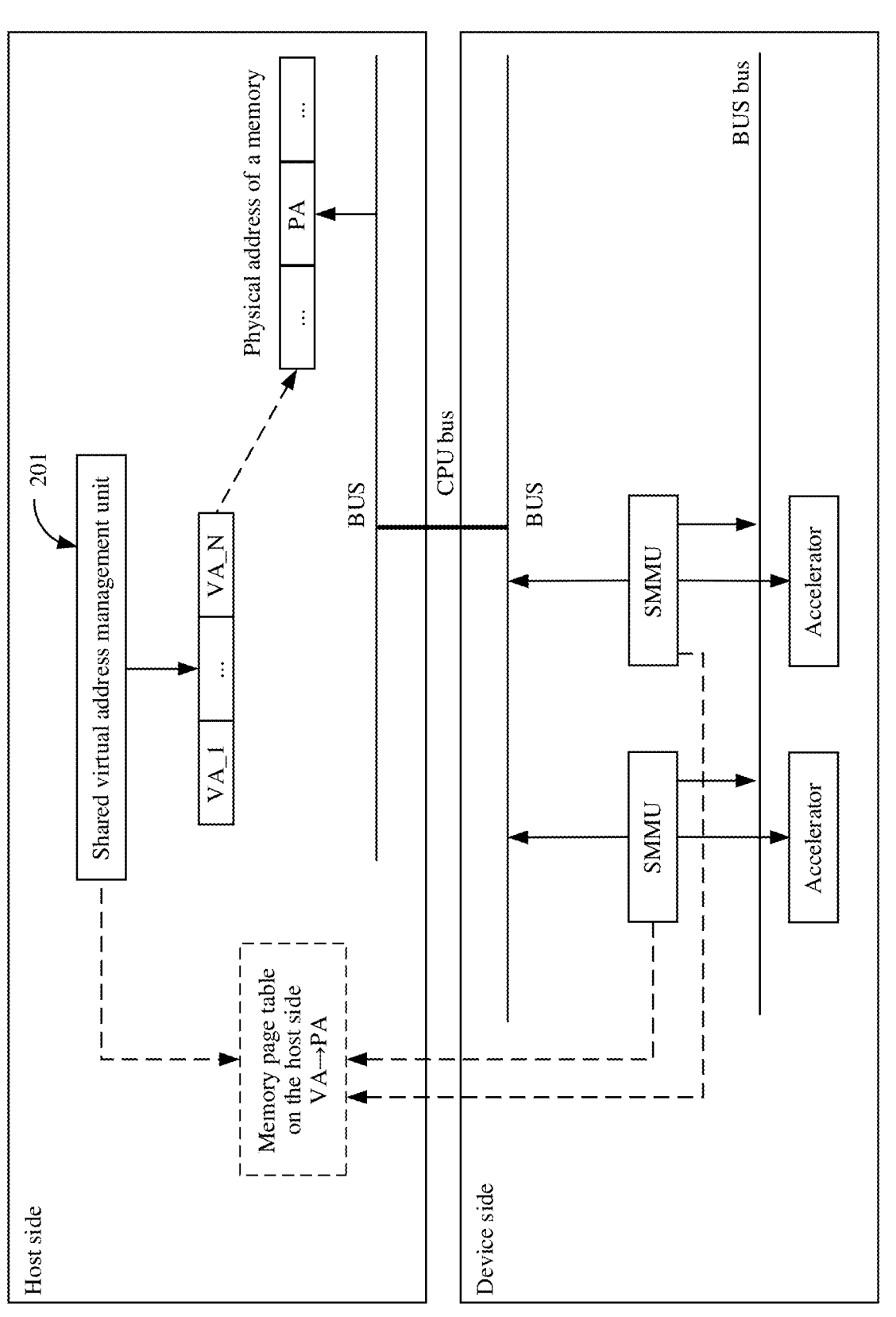
FIG. 2c is a schematic diagram of a system architecture of another heterogeneous system according to an embodiment of this application.

FIG. 2*c* is a schematic diagram of another system of a host side memory and a device side memory according to an embodiment of this application. In the example shown in FIG. 2*c*, compared with the heterogeneous system shown in FIG. 2*a*, a heterogeneous system in FIG. 2*c* mainly includes the shared virtual address management unit 201, and there is no shared virtual address agent unit or agent system memory management unit on a device side.

In the example shown in FIG. 2*c*, the device side directly accesses a memory page table of the heterogeneous system via an SMMU, to translate a virtual address to a physical address. This achieves an objective that the device side accesses memory space on a host side or another device side across chips through a virtual address.

The following separately describes a memory sharing method according to embodiments of this application with reference to the system architectures of the heterogeneous systems shown in FIG. 2*a* to FIG. 2*c*.

First, the system architecture shown in FIG. 2*a* is used as an example to describe the memory sharing method according to an embodiment of this application. FIG. 3 is a schematic flowchart of a memory sharing method according to an embodiment of this application. The memory sharing method shown in FIG. 3 includes but is not limited to the following steps.

301: A host side establishes a first memory page table via a shared virtual address management unit.

The host side establishes the first memory page table on the host side via the shared virtual address management unit. The first memory page table is a memory page table stored on the host side. The first memory page table includes a mapping relationship between a virtual address on the host side and a physical address on the host side. The mapping relationship is a correspondence between the virtual address and the physical address on the host side. The host side or a device side can query, based on the mapping relationship, the first memory page table to obtain a physical address corresponding to a to-be-accessed virtual address.

The table 1 is a schematic table of a first memory page table according to an embodiment of this application. In an example of step 301, the host side establishes the memory page table shown in the table 1 via the shared virtual address management unit. The memory page table includes mapping relationships between virtual addresses and physical addresses. The mapping relationship can indicate a physical address corresponding to a virtual address to be accessed by the host side or the device side. For example, the host side may find that a physical address corresponding to a virtual address "0x756FCD20" is "0x1FFF2000" by querying the memory page table shown in the table 1.

TABLE 1

| Virtual address | Physical address |
|---|---|
| 0x756FCD20 | 0x1FFF2000 |
| 0x756FCD30 | 0x1FFF2020 |
| 0x756FCD40 | 0x1FFF2040 |
| 0x756FCD50 | 0x1FFF2060 |
| 0x756FCD60 | 0x1FFF2080 |
| . . . | . . . |

302: A first device side establishes a second memory page table via a shared virtual address agent unit.

The first device side establishes the second memory page table on the first device side via the shared virtual address agent unit. The second memory page table includes mapping from a virtual address on the first device side to a physical address on the first device side. A structure of the second memory page table is similar to that of the first memory page table. Details are not described herein again. In this embodiment of this application, the physical address on the host side and the physical address on the first device side are physical addresses obtained through unified addressing.

Specifically, before the first device side establishes the second memory page table, the shared virtual address management unit on the host side sends a memory page table establishment request to the first device side. The shared virtual address agent unit on the first device side establishes the second memory page table on the first device side based on the memory page table establishment request.

303: The first device side updates the second memory page table based on the first memory page table, or the host side updates the first memory page table based on the second memory page table.

An agent system memory management unit SMMU on the first device side updates the second memory page table based on the first memory page table, or the host side updates the first memory page table based on the second memory page table.

Specifically, in a process in which the host side and the first device side access virtual addresses, when a virtual address to be accessed by the host side cannot be obtained by querying the first memory page table, but can be obtained by querying the second memory page table on the first device side, the first device side updates mapping from the virtual address to a physical address in the second memory page table into the first memory page table. Alternatively, when a virtual address to be accessed by the first device side cannot be obtained by querying the second memory page table, but can be obtained by querying the first memory page table on the host side, the first device side updates mapping from the virtual address to a physical address in the first memory page table into the second memory page table.

The following describes the process in which the host side and the device side updates a memory page table in step 303 with reference to three memory space access scenarios. The access scenarios of memory access in the heterogeneous system include: (1) A first device side accesses a physical memory on a host side through a virtual address; (2) A host side accesses a physical memory on a first device side through a virtual address; and (3) A second device side accesses a physical memory on a first device side. The following separately describes the access scenarios.

(1) A first device side accesses a physical memory on a host side through a virtual address.

FIG. 4*a* is a schematic flowchart of a procedure in which a first device side accesses a physical memory on a host side in a heterogeneous system according to an embodiment of this application. The method embodiment shown in FIG. 4*a* includes but is not limited to the following steps.

401: The first device side queries a first memory page table based on a first virtual address, to obtain a first physical address.

When accessing the first virtual address, the first device side queries a second memory page table on the first device side for a physical address corresponding to the first virtual address. When the local second memory page table on the first device side does not include the first virtual address, the first device side queries the first memory page table on a host side, to obtain a first physical address corresponding to the first virtual address.

Figure 4B:
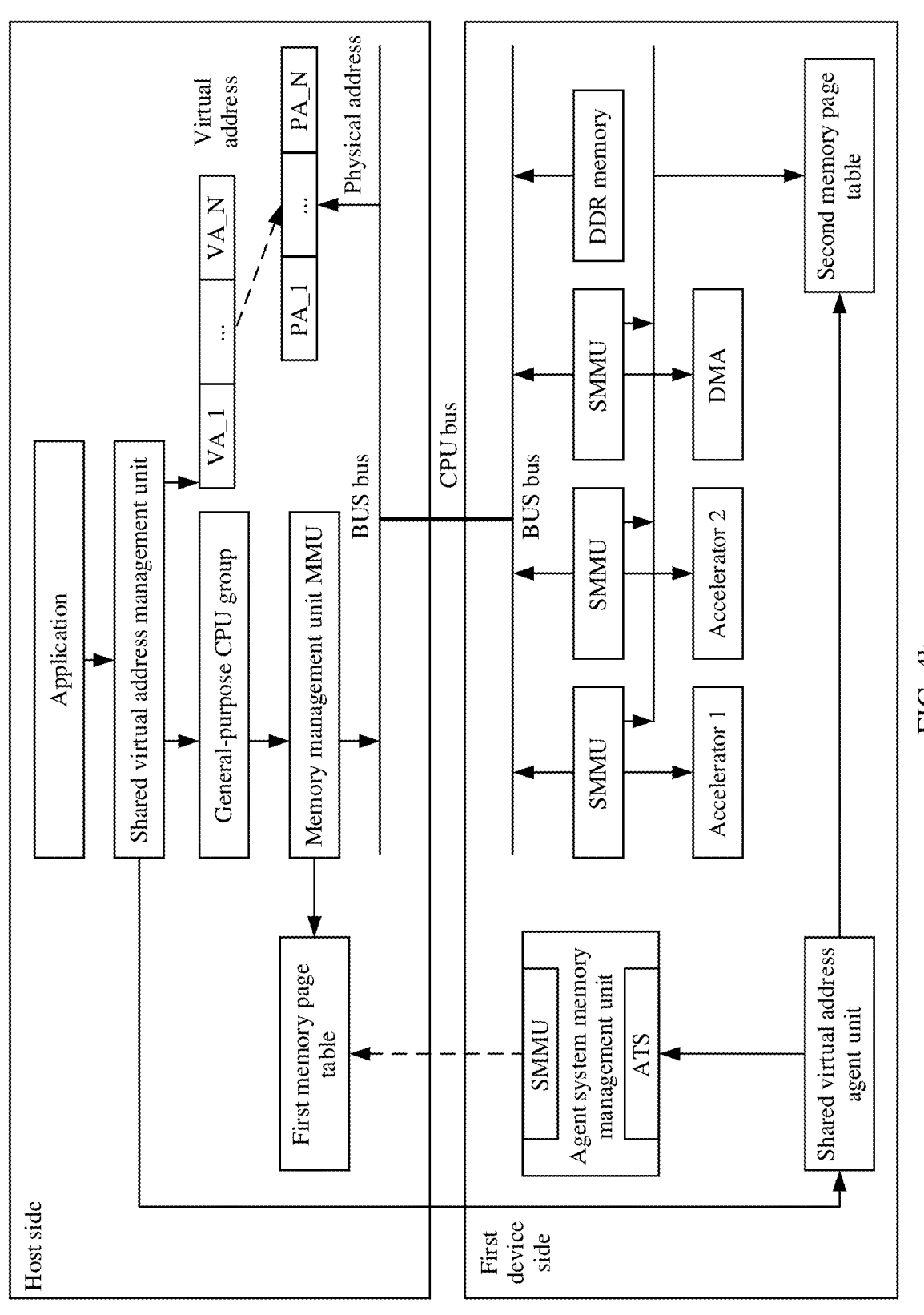
FIG. 4b is a schematic diagram of a system architecture of another heterogeneous system according to an embodiment of this application.

FIG. 4*b* is a schematic diagram of accessing a physical memory on a host side by a first device side according to an embodiment of this application. In the example shown in FIG. 4*b*, when the first device side accesses a first virtual address, a shared virtual address agent unit on the first device side queries a first memory page table on the host side via an SMMU module in an agent SMMU, to obtain a first physical address. Then, the agent system memory management unit returns the first physical address corresponding to the first virtual address.

402: The first device side adds a mapping relationship between the first virtual address and the first physical address to the second memory page table.

After obtaining the first physical address corresponding to the first virtual address, the mapping relationship between the first virtual address and the first physical address is added to the second memory page table on the first device side. In this way, when the first device side accesses the first virtual address again, the first device side can query the local second memory page table for the corresponding first physical address.

For example, in the example shown in FIG. 4b, after obtaining the first physical address corresponding to the first virtual address, the first device side adds the mapping from the first virtual address to the first physical address to the second memory page table via the shared virtual address agent unit.

403: The first device side queries the second memory page table based on the first virtual address, to obtain a second physical address.

When the first device side accesses the first virtual address again, because the mapping from the first virtual address to the second physical address is added to the second memory page table, the first device side queries the second memory page table based on the first virtual address, to obtain the first physical address.

For example, in the example shown in FIG. 4b, when an accelerator on the first device side needs to access the first virtual address again, the accelerator directly queries the second memory page table on the first device side via the SMMU, to obtain the first physical address corresponding to the first virtual address.

404: The first device side accesses a physical memory on the host side based on the first physical address.

The first device side accesses the physical memory on the host side based on the obtained first physical address. Specifically, the first device side accesses the physical memory on the host side based on the first physical address through a CPU bus.

For example, in the example shown in FIG. 4b, after obtaining the first physical address by querying the first memory page table, the first device side accesses the first physical address on the host side through the CPU bus.

Figure 4C:
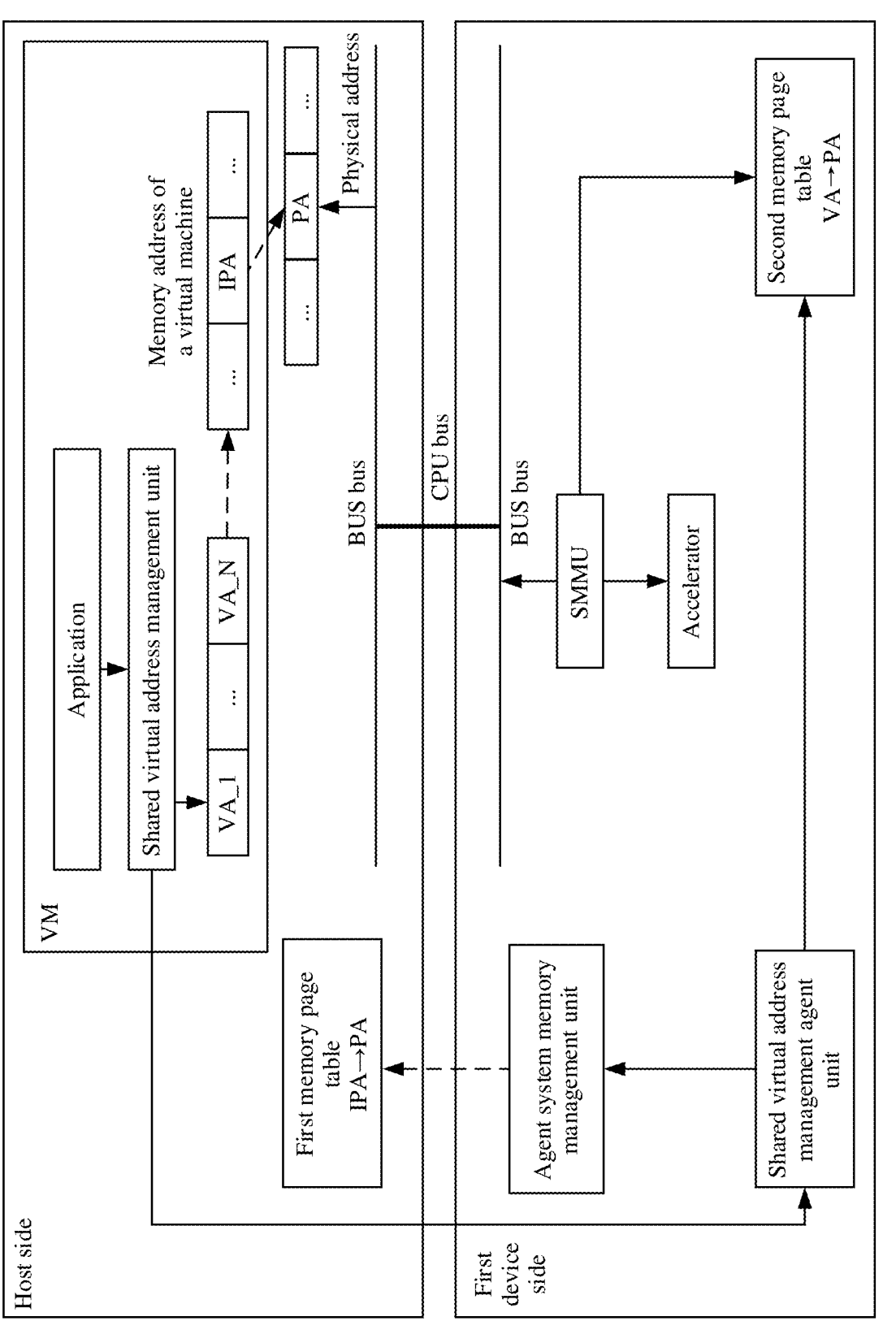
FIG. 4c is a schematic diagram of a system architecture of another heterogeneous system according to an embodiment of this application.

FIG. 4c is a schematic diagram of a system architecture in which an application program on a host side is deployed on a virtual machine according to an embodiment of this application. In the example shown in FIG. 4c, a difference from the system architecture shown in FIG. 4b is that a first memory page table includes mapping from a memory address IPA to a physical address PA of a memory in the virtual machine.

Therefore, in the system architecture in FIG. 4c, in a process in which a first device side queries the first memory page table based on a first virtual address to obtain a first physical address, the first device side first determines a memory address of the virtual machine based on the first virtual address, and then queries the first memory page table based on the physical address of the memory in the virtual machine, to obtain the first physical address.

(2) A host side accesses a physical memory on a first device side.

Figure 5A:
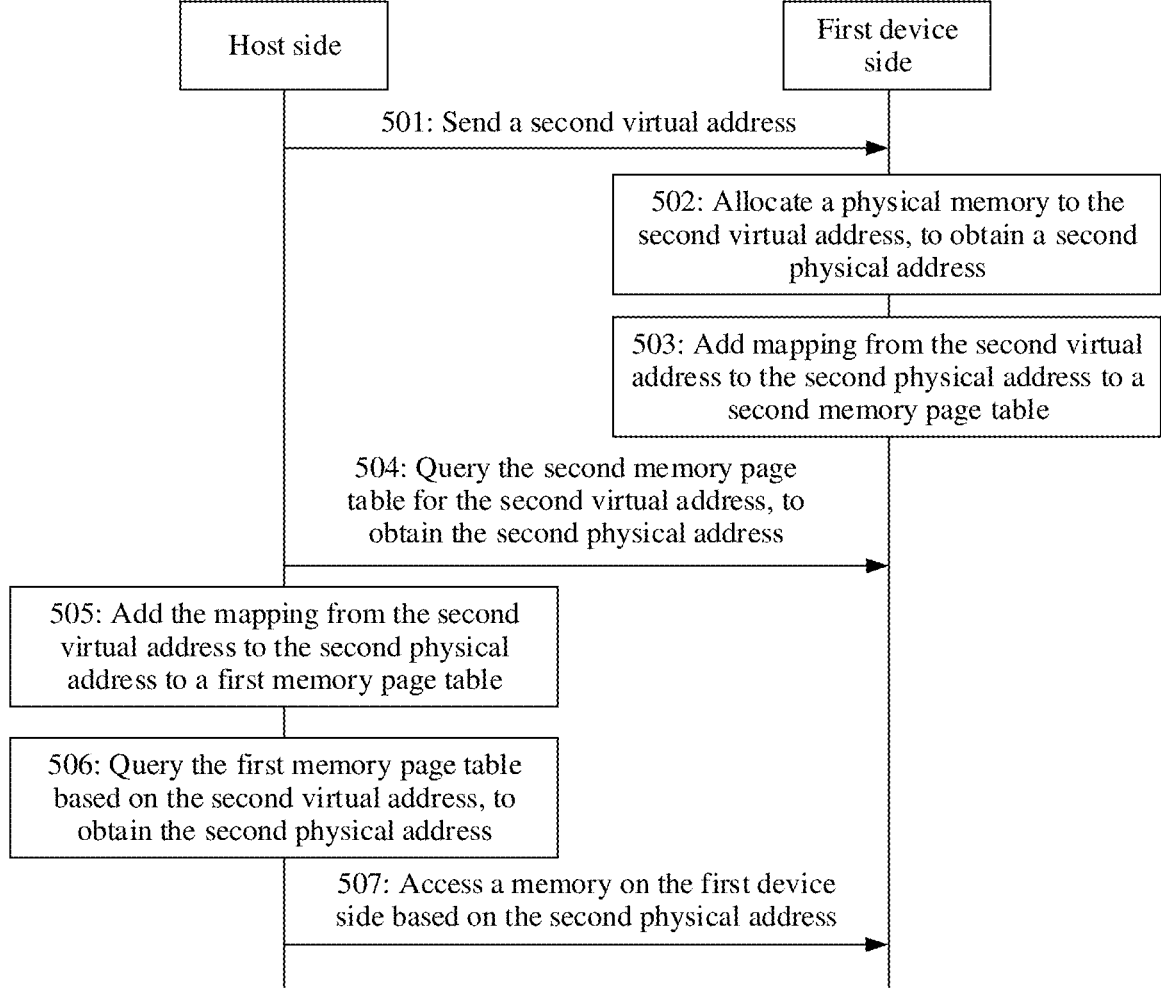
FIG. 5a is a schematic flowchart of another memory sharing method according to an embodiment of this application.

FIG. 5a is a schematic flowchart of a procedure in which a host side accesses a physical memory on a first device side in a heterogeneous system according to an embodiment of this application. The method embodiment shown in FIG. 5a includes but is not limited to the following steps.

501: The host side sends a second virtual address to the first device side.

Before accessing a memory on the first device side, an application on the host side first applies for the second virtual address via a shared virtual address management unit, and then sends the second virtual address to a shared virtual address agent unit on the first device side.

Figure 5B:
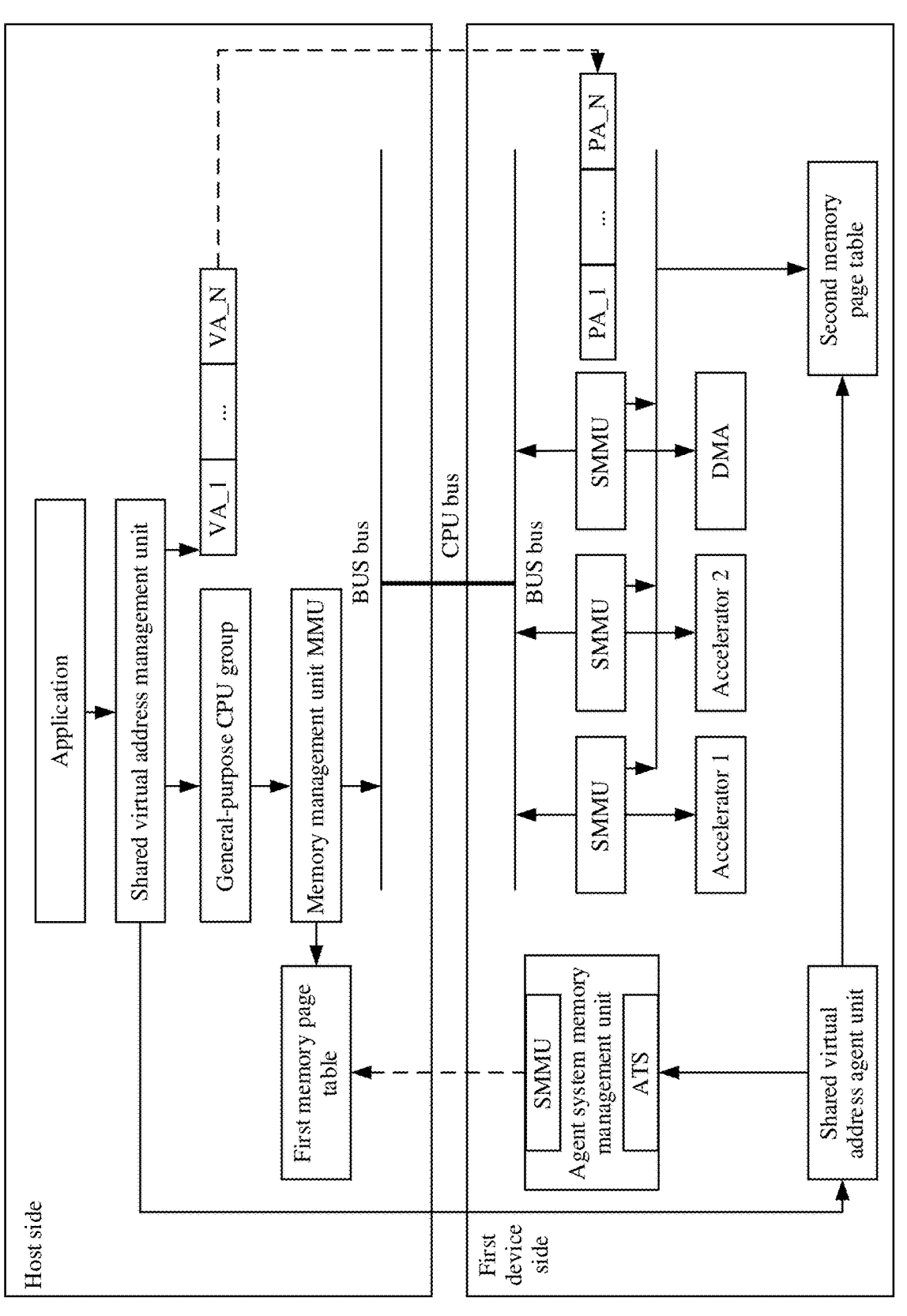
FIG. 5b is a schematic diagram of a system architecture of another heterogeneous system according to an embodiment of this application.

FIG. 5b is a schematic diagram of accessing a physical memory on a first device side by a host side according to an embodiment of this application. In the example shown in FIG. 5b, after obtaining the second virtual address by applying for the second virtual address via the shared virtual address management unit, the application on the host side sends the second virtual address to the shared virtual address agent unit on the first device side.

502: The first device side allocates a physical memory to the second virtual address, to obtain a second physical address.

After the shared virtual address agent unit on the first device side receives the second virtual address, the first device side allocates the physical memory to the second virtual address, to obtain the second physical address. After obtaining the second physical address, a first device may send the second physical address to the host side, or may store the second physical address on the host side. This is not specifically limited.

For example, in the example shown in FIG. 5b, the shared virtual address agent unit on the first device side allocates the physical memory to the second virtual address sent by the host side, to obtain the second physical address. The shared virtual address agent unit on the first device side may send the second physical address obtained through allocation to the host side.

503: The first device side adds mapping from the second virtual address to the second physical address to a second memory page table.

After the first device side allocates the second physical address for the second virtual address, the first device side adds the mapping from the second virtual address to the second physical address to the second memory page table. When accessing the second virtual address, the first device side may directly query the second memory page table for the second physical address corresponding to the second virtual address.

For example, in the example shown in FIG. 5b, after allocating the physical memory to the second virtual address to obtain the second physical address, the first device side adds the mapping from the second virtual address to the second physical address to the second memory page table.

It may be understood that step 502 and step 503 are steps performed when the first device allocates the physical memory to the second virtual address for the first time. When accessing the second virtual address again, the host side may alternatively obtain the second physical address corresponding to the second virtual address based on a first memory page table or the second memory table.

504: The host side queries the second memory page table for the second virtual address, to obtain the second physical address.

In a process in which the host side accesses the second virtual address, when the second virtual address is not found in the first memory page table on the host side, the host side queries the second memory page table on the device side for the second virtual address, to obtain the second physical address.

505: The host side adds the mapping from the second virtual address to the second physical address to the first memory page table.

The host side adds the mapping from the second virtual address to the second physical address to the first memory page table. Specifically, the second physical address may be the second physical address returned by the first device side after the first device side allocates the physical memory to the second virtual address in step 502, or may be the second physical address obtained by querying the second memory page table on the host side for the second virtual address in step 504. This is not specifically limited.

When the second physical address is the second physical address returned by the first device side after the first device side allocates the physical memory to the second virtual address in step 502, step 504 may not be performed when the host side accesses the second virtual address.

506: The host side queries the first memory page table based on the second virtual address, to obtain the second physical address.

After the host side adds the mapping from the second virtual address to the second physical address to the first memory page table, when the host side accesses the second virtual address again, the host side queries the first memory page table on the host side based on the second virtual address, to obtain the second physical address.

For example, in the example shown in FIG. 5b, when the application on the host side accesses the second virtual address, a central processing unit CPU on the host side sends the second virtual address to a memory management unit MMU on the host side. The MMU queries the first memory page table to obtain the second physical address corresponding to the second virtual address.

507: The host side accesses a memory on the first device side based on the second physical address.

The host side accesses the physical memory on the first device side across chips based on the second physical address through a CPU bus.

For example, in the example shown in FIG. 5b, after obtaining the second physical address corresponding to the second virtual address by querying the first memory page table, the host side accesses the second physical address of the memory on the first device side across chips through the CPU bus.

(3) A second device side accesses a physical memory on a first device side.

Figure 6A:
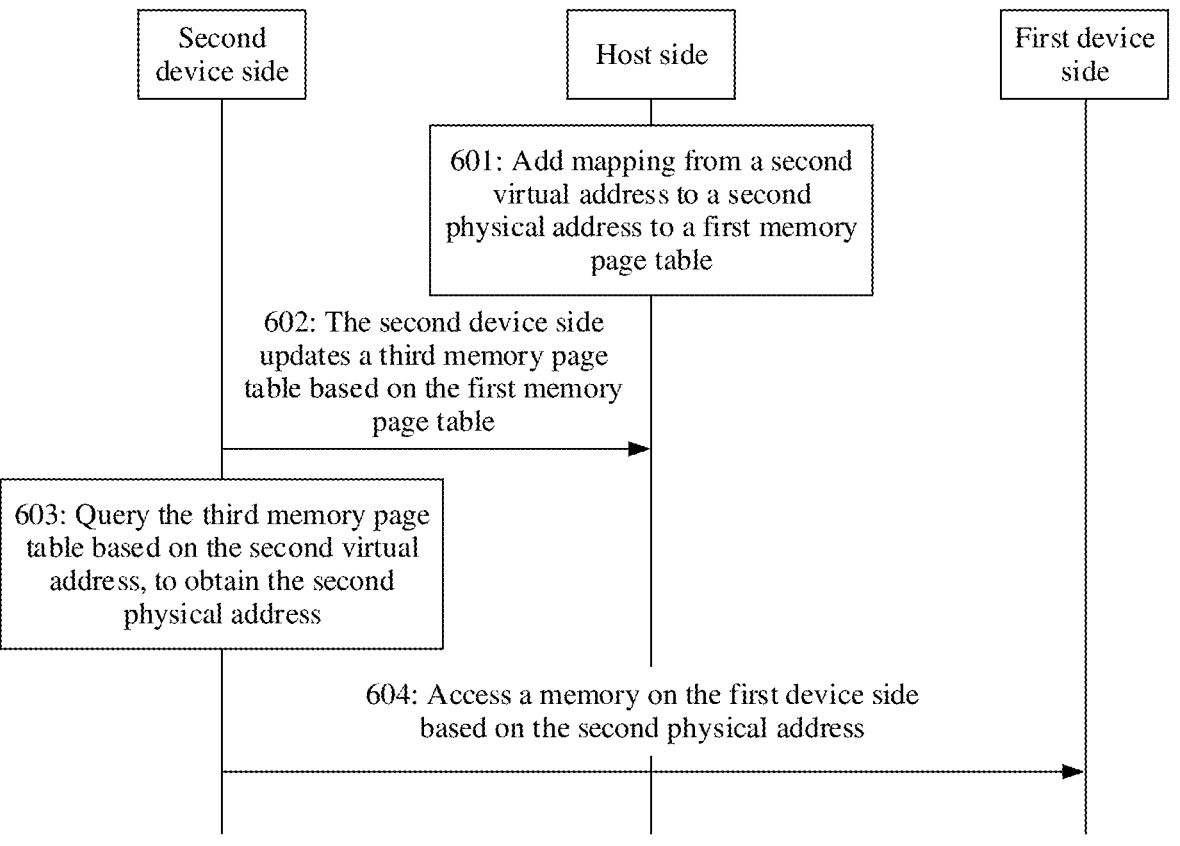
FIG. 6a is a schematic flowchart of another memory sharing method according to an embodiment of this application.

FIG. 6a is a schematic flowchart of a procedure in which a second device side accesses a physical memory on a first device side in a heterogeneous system according to an embodiment of this application. The method embodiment shown in FIG. 6a includes but is not limited to the following steps.

601: The host side adds mapping from a second virtual address to a second physical address to a first memory page table.

Step 601 in this embodiment of this application is similar to the step performed on the host side in step 505 shown in FIG. 5a. Details are not described herein again.

602: The second device side updates a third memory page table based on the first memory page table.

The second device side updates the third memory page table on the second device side based on the first memory page table. Specifically, the second device side queries the first memory page table on the host side for the second physical address corresponding to the second virtual address, and adds mapping from the second virtual address to the second physical address to the third memory page table on the second device side.

Figure 6B:
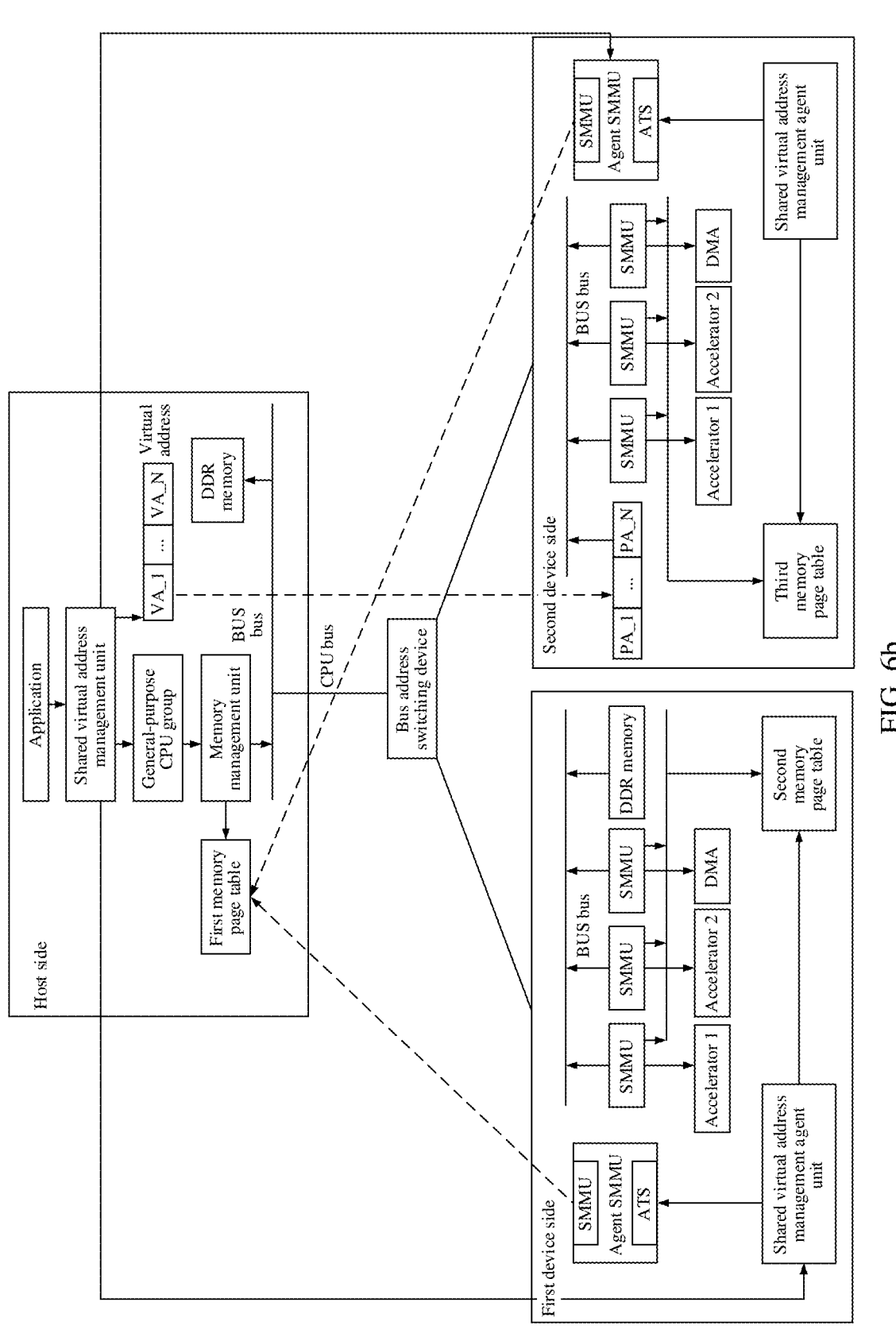
FIG. 6b is a schematic diagram of a system architecture of another heterogeneous system according to an embodiment of this application.

FIG. 6b is a schematic diagram of accessing a physical memory on a first device side by a second device side according to an embodiment of this application. In the example shown in FIG. 6b, the first memory page table on the host side includes the mapping from the second virtual address to the second physical address. After obtaining, from the first memory page table, the mapping from the second virtual address to the second physical address, the second device side adds the mapping from the second virtual address to the second physical address to the third memory page table on the second device side.

603: The second device side queries the third memory page table based on the second virtual address, to obtain the second physical address.

After the second device side adds the mapping from the second virtual address to the second physical address to the third memory page table, when the second device side accesses the second virtual address again, the second device side queries the third memory page table on the second device side based on the second virtual address, to obtain the second physical address.

For example, in the example shown in FIG. 6b, when an accelerator on the second device side accesses the second virtual address, the accelerator on the second device side queries the third memory page table via a system memory management unit, to obtain the second physical address corresponding to the second virtual address.

604: The second device side accesses the physical memory on the first device side based on the second physical address.

The second device side accesses the physical memory on the first device side across devices based on the second physical address through a CPU bus.

For example, in the example shown in FIG. 6b, after obtaining the second physical address corresponding to the second virtual address via the system memory management unit through a query, the accelerator on the second device side accesses the second physical address on the first device side through the CPU bus between the second device side and the first device side.

In the heterogeneous system in this embodiment of this application, both the host side and the first device side can separately establish a local memory page table, and the memory page table on the host side and the memory page table on the first device side can synchronize with each other. In this way, both the memory page table on the host side and the memory page table on the first device side include mapping from a virtual address to a physical address in the heterogeneous system. In addition, both the host side and the first device side can query, in the local memory page table, a physical address corresponding to a virtual address to be accessed. This improves a speed of memory access between devices in the heterogeneous system. In addition, in the heterogeneous system, unified addressing enables direct access to physical addresses between devices. This reduces complexity of sharing memory in the heterogeneous system.

The system architecture shown in FIG. 2a is used as an example to describe the memory sharing method according to an embodiment of this application. The following uses FIG. 2b and FIG. 2c as examples to describe a memory sharing method according to an embodiment of this application.

Figure 7A:
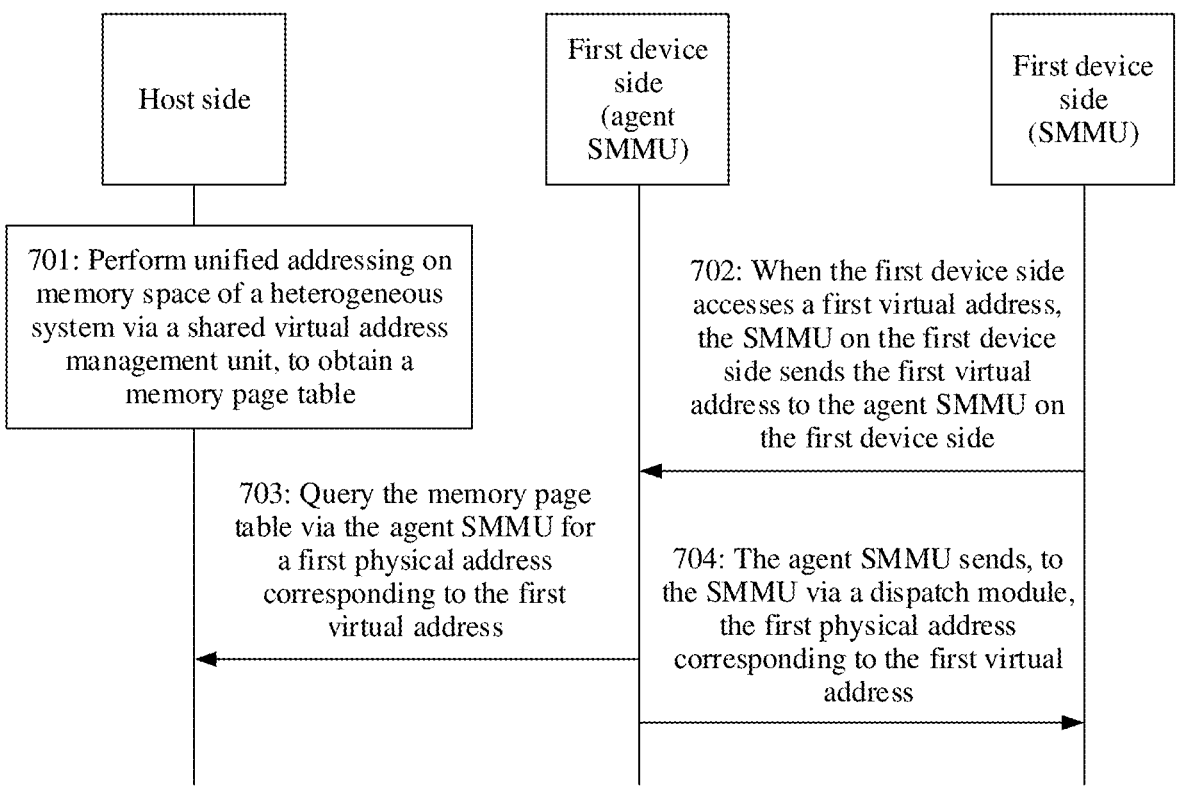
FIG. 7a is a schematic flowchart of another memory sharing method according to an embodiment of this application.

FIG. 7a is a schematic flowchart of another memory sharing method according to an embodiment of this application. In the example shown in FIG. 7a, for a heterogeneous system, the system architecture shown in FIG. 2b is used as an example. The memory sharing method according to this embodiment of this application includes the following steps.

701: A host side performs unified addressing on memory space of the heterogeneous system via a shared virtual address management unit, to obtain a memory page table.

The host side performs unified addressing on the memory space of the heterogeneous system via the shared virtual address management unit, to obtain the memory page table of the heterogeneous system. The memory page table includes mapping from a virtual address to a physical address in the heterogeneous system. In addition, in the heterogeneous system after unified addressing, different devices are interconnected through a CPU bus. Unified addressing enables direct access to physical addresses between devices.

Figure 7B:
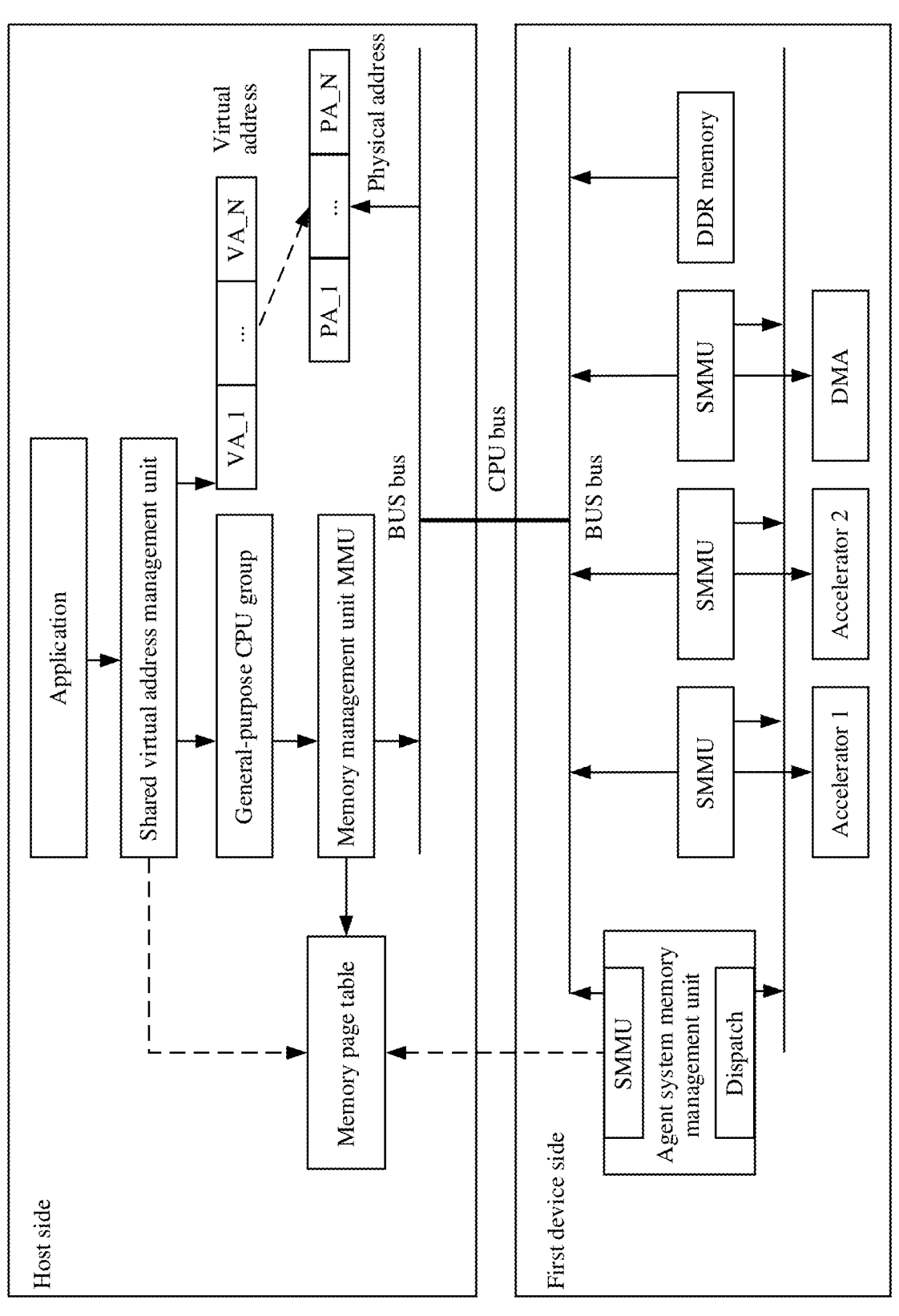
FIG. 7b is a schematic diagram of a system architecture of another heterogeneous system according to an embodiment of this application.

FIG. 7b is a schematic diagram of a system architecture of another heterogeneous system according to an embodiment of this application. In the heterogeneous system shown in FIG. 7b, an application on a host side performs unified addressing on a memory of the heterogeneous system via a shared virtual address management unit, to obtain a memory page table of the heterogeneous system. The memory page table is stored on the host side.

In this embodiment of this application, after performing unified addressing on memory space of the heterogeneous system via the shared virtual address management unit to obtain the memory page table, the host side may alternatively send the memory page table to a first device side. When the memory page table is stored on the first device side, when accessing the memory page table, the first device side does not need to access the memory page table on the host side across devices.

Figure 7C:
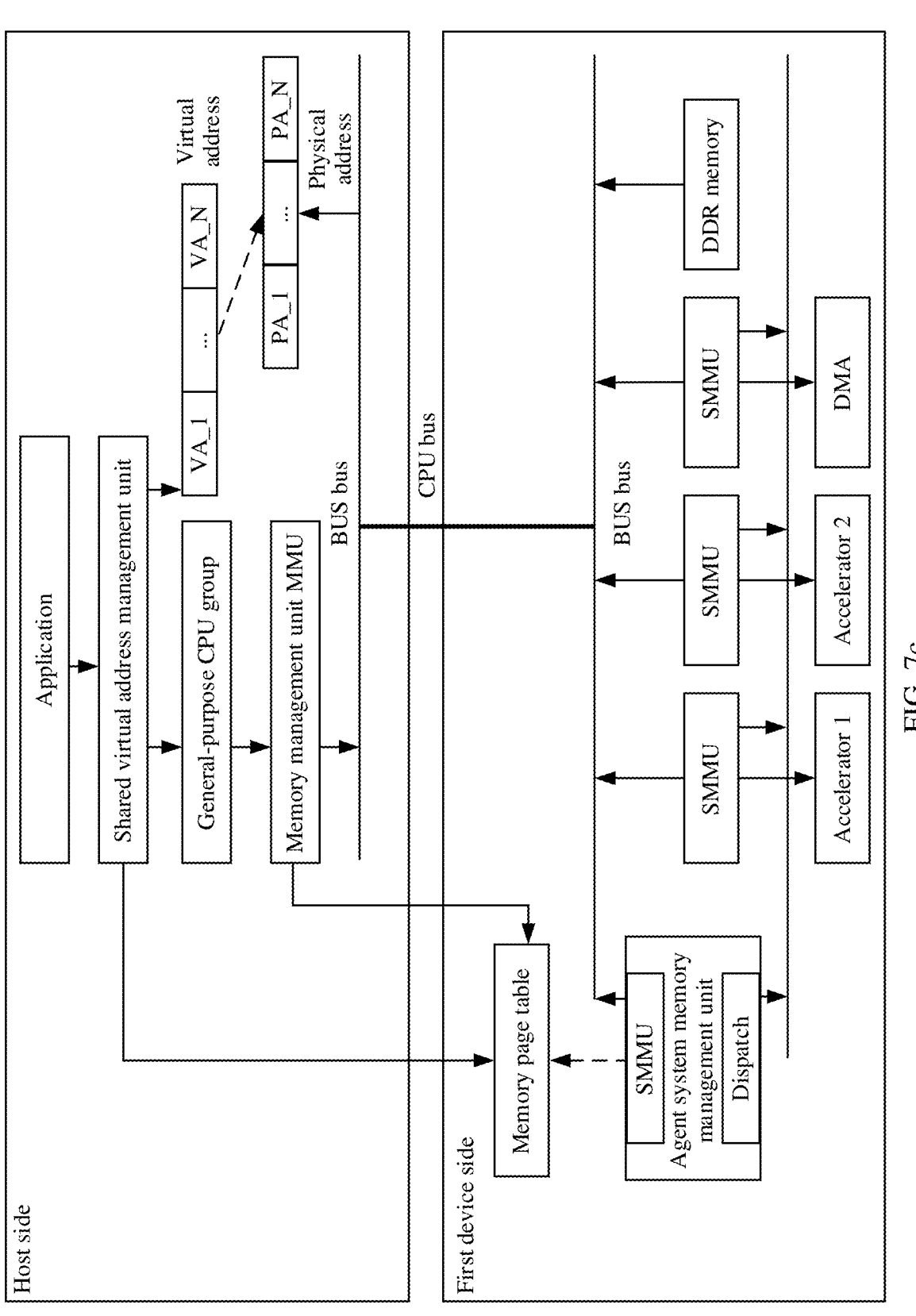
FIG. 7c is a schematic diagram of a system architecture of another heterogeneous system according to an embodiment of this application.

FIG. 7c is a schematic diagram of a system architecture of another heterogeneous system according to an embodiment of this application. In the system architecture shown in FIG. 7c, after performing unified addressing on a memory of the heterogeneous system via a shared virtual address management unit to obtain a memory page table of the heterogeneous system, an application on a host side returns the memory page table to a first device side, and the memory page table is stored on the first device side.

702: When the first device side accesses a first virtual address, a system memory management unit SMMU on the first device side sends the first virtual address to an agent SMMU on the first device side.

When the first device side accesses the first virtual address, the system memory management unit SMMU on the first device side sends the first virtual address to the agent SMMU on the first device side. Specifically, the system memory management unit SMMU on the first device side sends the first virtual address to a dispatch module on the first device side. The dispatch module forwards the first virtual address to an SMMU module of the agent SMMU.

For example, in the example shown in FIG. 7b, after obtaining the to-be-accessed first virtual address, an accelerator on the first device side sends the first virtual address to an SMMU to which the accelerator belongs, to query a physical address corresponding to the first virtual address. The SMMU forwards a query request for the first virtual address to the agent SMMU.

703: The first device side queries the memory page table via the agent SMMU for the first physical address corresponding to the first virtual address.

The first device side queries the memory page table on the host side via the agent SMMU for the first physical address corresponding to the first virtual address. It may be understood that when the memory page table is stored on a peer device side, the agent SMMU may query the memory page table on the first device side for the first physical address corresponding to the first virtual address.

For example, in the example shown in FIG. 7b, the dispatch module of the agent SMMU forwards the query request to the SMMU of the agent SMMU. The SMMU of the agent SMMU queries the memory page table on the host side for the first physical address corresponding to the first virtual address.

704: The agent SMMU on the first device side sends, to the SMMU via the dispatch module, the first physical address corresponding to the first virtual address.

The agent SMMU on the first device side sends, to the SMMU via the dispatch module, the first physical address corresponding to the first virtual address. After obtaining the first physical address, the first device side accesses the first physical address across devices through the CPU bus.

For example, in the example shown in FIG. 7b, after obtaining the first physical address through a query, the SMMU of the agent SMMU returns the first physical address to the accelerator on the first device side. After obtaining the first physical address, the accelerator may access the first physical address through the CPU bus. The first physical address is a memory address on the host side.

It should be noted that this embodiment shown in FIG. 7a is merely an example in which the first device side accesses the physical memory on the host side in the heterogeneous system architecture shown in FIG. 2b. In the heterogeneous system architecture shown in FIG. 2b, a step in which the host side accesses the physical memory on the first device side based on the memory page table and a step in which a second device side accesses the physical memory on the first device side based on the memory page table are similar to those in embodiments in FIG. 5a and FIG. 6a. Details are not described again.

In this embodiment of this application, the system memory management unit on the first device side may access the memory page table on the host side via the agent SMMU. In this way, a plurality of system memory management units on the first device side do not directly access the memory page table on the host side. In addition, the agent SMMU on the first device side may alternatively synchronize a returned physical address with that in the SMMU on the first device side. This improves a speed of memory access across devices in a heterogeneous system.

Figure 8A:
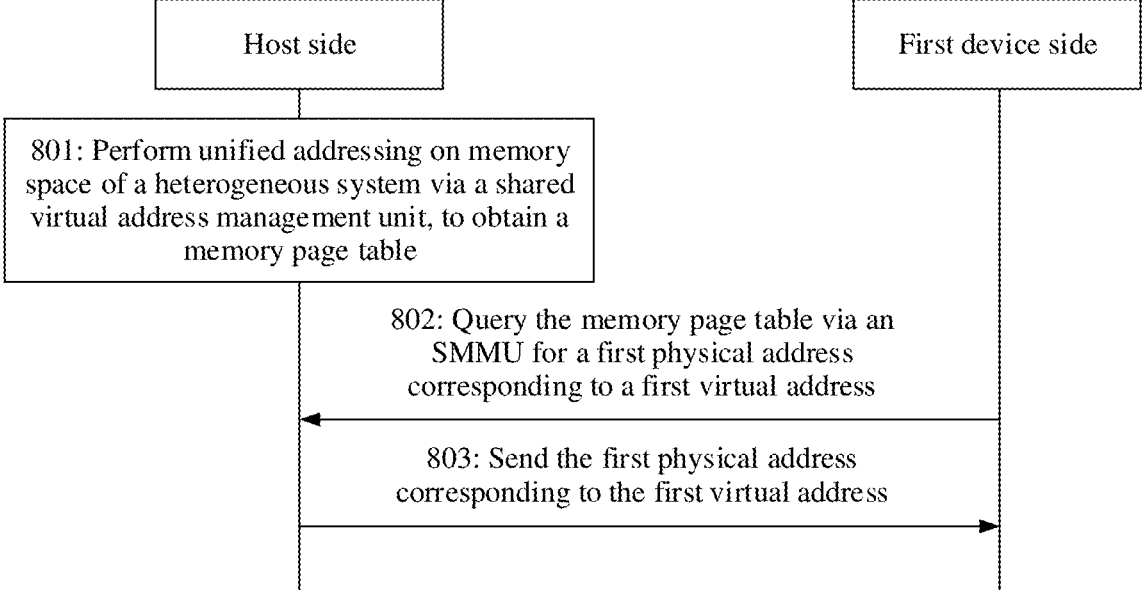
FIG. 8a is a schematic flowchart of another memory sharing method according to an embodiment of this application.

FIG. 8a is a schematic flowchart of another memory sharing method according to an embodiment of this application. In the example shown in FIG. 8a, for a heterogeneous system, the system architecture shown in FIG. 2c is used as an example. The memory sharing method according to this embodiment of this application includes the following steps.

801: A host side performs unified addressing on memory space of the heterogeneous system via a shared virtual address management unit, to obtain a memory page table.

Step 801 in this embodiment of this application is similar to step 701 in the method embodiment shown in FIG. 7a. Details are not described again.

802: A first device side queries the memory page table via an SMMU for a first physical address corresponding to a first virtual address.

When accessing the first virtual address, the first device side queries the memory page table on the host side via the SMMU for the first physical address corresponding to the first virtual address.

Figure 8B:
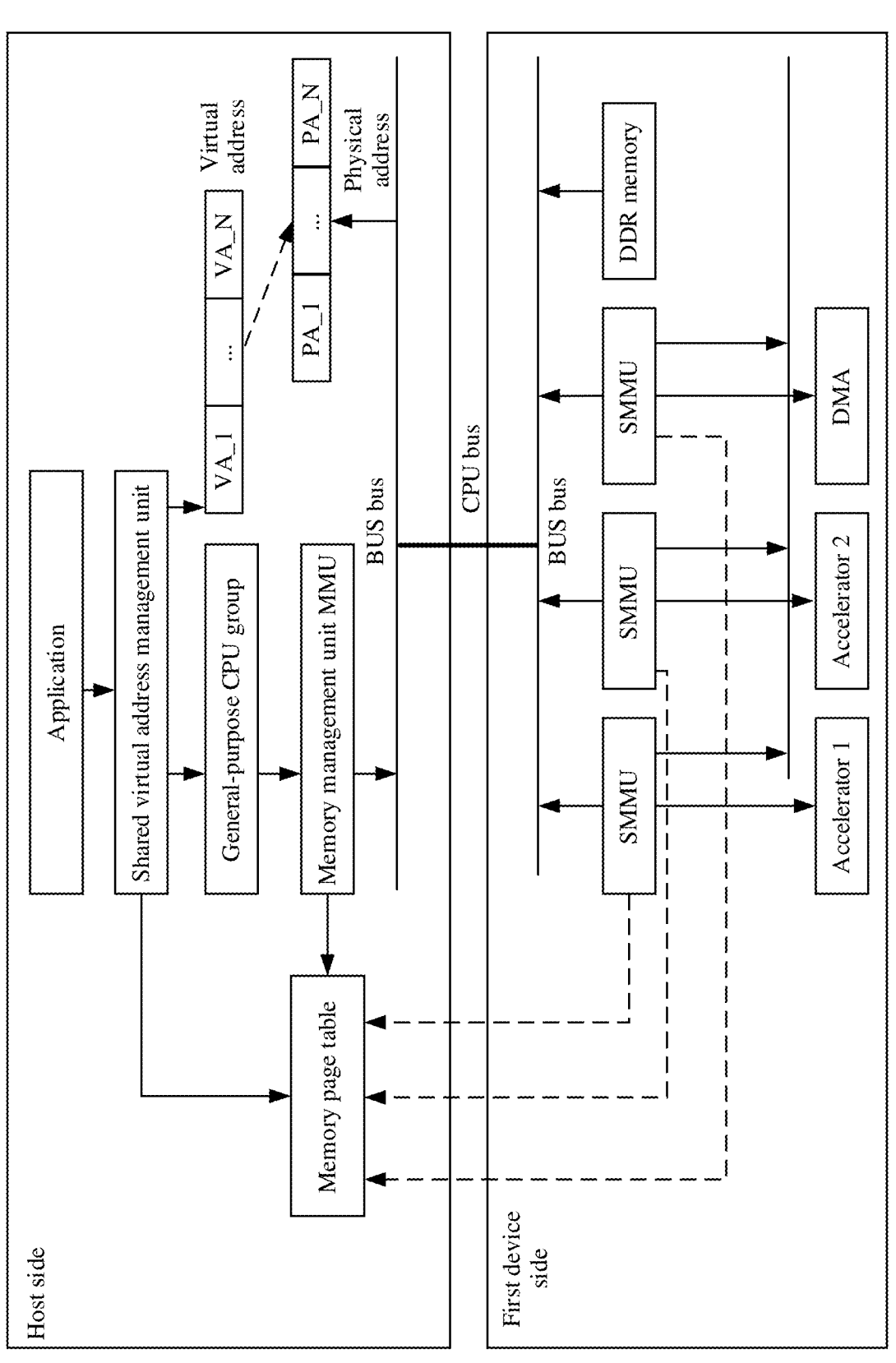
FIG. 8b is a schematic diagram of a system architecture of another heterogeneous system according to an embodiment of this application.

FIG. 8b is a schematic diagram of a system architecture of another heterogeneous system according to an embodiment of this application. In the heterogeneous system shown in FIG. 8b, an application on the host side applies for a physical memory on the host side via the shared virtual address management unit, and establishes a memory page table on the host side. Then, the host side initializes and configures each SMMU on the first device side via a kernel interface of an operating system, so that each SMMU on the first device side can access the memory page table. After obtaining the to-be-accessed first virtual address, an accelerator on the first device side sends the first virtual address to an SMMU to which the accelerator belongs, to query for the physical address. The first device side queries, via the SMMU, the memory page table on the host side for the first physical address corresponding to the first virtual address.

803: The host side sends, to the first device side, the first physical address corresponding to the first virtual address.

The host side sends, to the first device side, the first physical address corresponding to the first virtual address. The first device side accesses the memory on the host side based on the first physical address.

For example, in the example shown in FIG. 8b, the first device side reads the memory page table on the host side across chips via the SMMU through a CPU bus, and obtains the first physical address through a query. The host side sends the first physical address to the accelerator on the first device side. After obtaining the first physical address, the accelerator accesses the first physical address through the CPU bus.

It should be noted that this embodiment shown in FIG. 8a is merely an example in which the first device side accesses the physical memory on the host side in the heterogeneous system architecture shown in FIG. 2c. In the heterogeneous system architecture shown in FIG. 2c, a step in which the host side accesses the physical memory on the first device side based on the memory page table and a step in which a second device side accesses the physical memory on the first device side based on the memory page table are similar to those in embodiments in FIG. 5a and FIG. 6a. Details are not described again.

In this embodiment of this application, the host side performs unified addressing on the memory space of the heterogeneous system via the shared virtual address management unit. In addition, the system memory management unit after initialization configuration on the first device side can directly access the memory page table on the host side, to implement translation from a virtual address to a physical address. The first device side can directly access a physical address on the host side through the CPU bus. This improves a speed of memory access across devices in a heterogeneous system.

The foregoing describes the memory sharing methods according to embodiments of this application. The following describes a related apparatus according to embodiments of this application with reference to the accompanying drawings.

Figure 9:
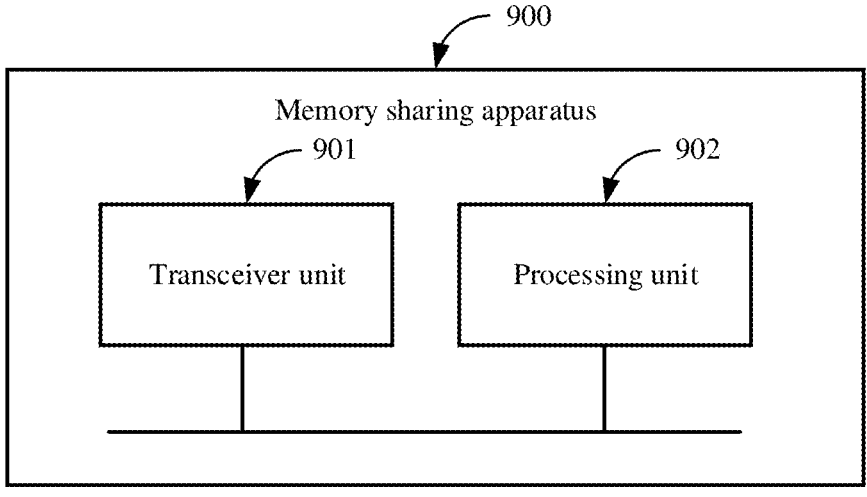
FIG. 9 is a schematic diagram of a structure of a memory sharing apparatus according to an embodiment of this application.

FIG. 9 is a schematic diagram of a structure of a memory sharing apparatus according to an embodiment of this application. As shown in FIG. 9, a memory sharing apparatus 900 includes a transceiver unit 901 and a processing unit 902. The memory sharing apparatus 900 may be configured to perform the method performed on the host side in the method embodiment, and may be configured to perform the method performed on the first device side or a second device side in the method embodiment.

In an example, the memory sharing apparatus 900 is configured to perform the method performed on the host side. In other words, the host side includes the transceiver unit 901 and the processing unit 902.

The processing unit 902 is configured to establish a first memory page table via a shared memory management unit. The first memory page table includes mapping from a virtual address on the host side to a physical address on the host side. The physical address on the host side and a physical address on a first device side are physical addresses obtained through unified addressing. The processing unit 902 updates the first memory page table based on a second memory page table.

In a possible implementation, the processing unit 902 is configured to add mapping from a second virtual address to a second physical address to the first memory page table.

In a possible implementation, the transceiver unit 901 is configured to send the second virtual address to the first device side. The second virtual address includes a virtual address allocated by the shared virtual address management unit on the host side.

In a possible implementation, the processing unit 902 is configured to query the first memory page table based on the second virtual address, to obtain the second physical address. The processing unit 902 is further configured to access a memory on the first device side based on the second physical address.

In another example, the memory sharing apparatus 900 is configured to perform the method performed on the first device side. In other words, the first device side includes the transceiver unit 901 and the processing unit 902.

The processing unit 902 is configured to establish a second memory page table. The second memory page table includes mapping from a virtual address on the first device side to a physical address on the first device side. A physical address on a host side and the physical address on the first device side are physical addresses obtained through unified addressing. An agent system memory management unit SMMU of the processing unit 902 updates the second memory page table based on a first memory page table.

In a possible implementation, the agent SMMU of the processing unit 902 is configured to query the first memory page table based on a first virtual address, to obtain a first physical address. The first virtual address is a virtual address to be accessed by the first device side, and the first physical address is a physical address on the host side. The processing unit 902 is configured to add mapping from the first virtual address to the first physical address to the second memory page table.

In a possible implementation, the processing unit 902 is configured to query the second memory page table based on the first virtual address, to obtain the first physical address. The processing unit 902 is further configured to access a memory on the host side based on the first physical address.

In a possible implementation, the processing unit 902 is configured to query the second memory page table based on a second virtual address, to obtain a second physical address. The second physical address is a physical address on the first device side.

In a possible implementation, the processing unit 902 allocates a physical memory to the second virtual address, to obtain the second physical address. The processing unit 902 is further configured to add mapping from the second virtual address to the second physical address to the second memory page table.

In another example, the memory sharing apparatus 900 is configured to perform the method performed on the second device side. In other words, the second device side includes the transceiver unit 901 and the processing unit 902.

An agent SMMU of the processing unit 902 is configured to update a third memory page table based on a first memory page table. The first memory page table includes mapping from a second virtual address to a second physical address. The processing unit 902 is further configured to query the third memory page table based on the second virtual address, to obtain the second physical address. The processing unit 902 is further configured to access a memory on the first device side based on the second physical address.

In another example, the memory sharing apparatus 900 is configured to perform the method performed on the host side. In other words, the host side includes the transceiver unit 901 and the processing unit 902.

The processing unit 902 is configured to perform unified addressing on memory space of a heterogeneous system via a shared virtual address management unit, to obtain a memory page table. The memory page table includes mapping from a virtual address to a physical address in the heterogeneous system. When a first device side accesses a first virtual address in the heterogeneous system, a system management unit SMMU on the first device side queries the memory page table based on the first virtual address, to obtain a first physical address. The first physical address includes a physical address on the host side.

In a possible implementation, the processing unit 902 is further configured to store the memory page table on the first device side.

In another example, the memory sharing apparatus 900 is configured to perform the method performed on the host side. In other words, the host side includes the transceiver unit 901 and the processing unit 902.

The host side performs unified addressing on memory space of a heterogeneous system via a shared virtual address management unit, to obtain a memory page table. The memory page table includes mapping from a virtual address to a physical address in the heterogeneous system. When the first device side accesses a first virtual address in the heterogeneous system, the processing unit 902 queries the memory page table based on the first virtual address, to obtain a first physical address. The first physical address includes a physical address on the host side. The processing unit 902 is further configured to access a memory on the host side based on the first physical address.

In a possible implementation, a system memory management unit SMMU of the processing unit 902 is configured to send the first virtual address to an agent SMMU of the processing unit 902. The agent SMMU of the processing unit 902 is configured to query the memory page table, to obtain the first physical address. The agent SMMU of the processing unit 902 is configured to send the first physical address to the SMMU of the processing unit 902 via a dispatch (dispatch) module.

It should be understood that division of units in the apparatus is merely logical function division, and can be fully or partially integrated into a physical entity in actual implementation, or physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, steps in the foregoing methods or the foregoing units may be implemented by using a hardware integrated logic circuit in a processor element, or may be implemented in the form of software invoked by the processing element.

It should be noted that for brief description, the foregoing method embodiments are represented as a series of actions. However, a person skilled in the art should know that this invention in this application is not limited to the described order of the actions. In addition, a person skilled in the art should also know that all embodiments described in this specification are all preferred embodiments, and the related actions are not necessarily mandatory to this application.

Another appropriate step combination that can be figured out by a person skilled in the art according to the content described above also falls within the protection scope of this application. In addition, a person skilled in the art should also be familiar to embodiments described in this specification all belong to example embodiments, and involved actions are not necessarily mandatory in this application.

Figure 10:
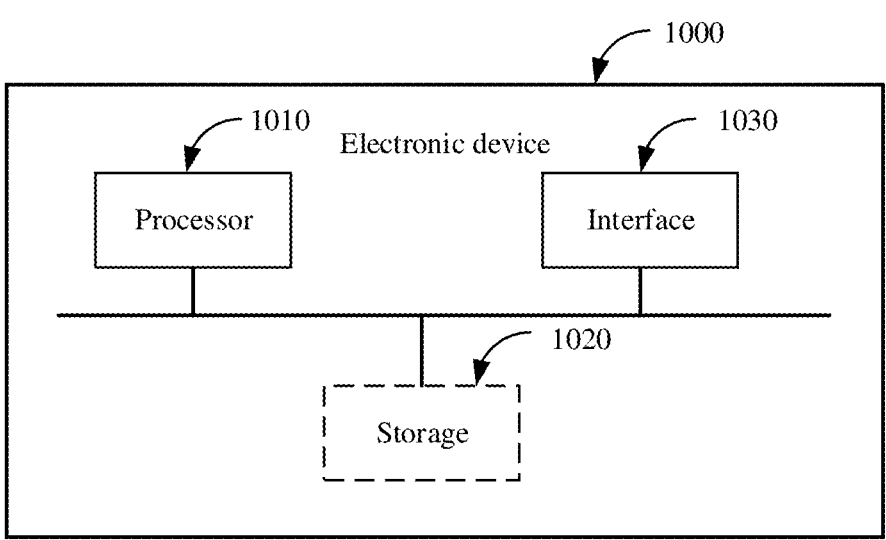
FIG. 10 is a schematic diagram of a structure of an electronic device according to an embodiment of this application.

FIG. 10 is a schematic diagram of a structure of an electronic device according to an embodiment of this application. As shown in FIG. 10, an electronic device 1000 includes a processor 1010, a storage 1020, and an interface 1030. The processor 1010, the storage 1020, and the interface 1030 are coupled through a bus (not marked in the figure). The storage 1020 stores instructions. When the execution instructions in the storage 1020 are executed, the electronic device 1000 performs the method performed on the host side, a first device side, or a second device side in the foregoing method embodiment.

The electronic device 1000 may be one or more integrated circuits configured to implement the foregoing method, for example, one or more application-specific integrated circuits (application-specific integrated circuits, ASICs), one or more microprocessors (digital signal processors, DSPs), one or more field programmable gate arrays (field programmable gate arrays, FPGAs), or a combination of at least two of these integrated circuit forms. For another example, when the units in the apparatus may be implemented in a form of scheduling a program by the processing element, the processing element may be a general-purpose processor, for example, a central processing unit (central processing unit, CPU) or another processor that can invoke the program. For another example, the units may be integrated and implemented in a form of a system-on-a-chip (system-on-a-chip, SOC).

The processor 1010 may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any regular processor or the like.

The storage 1020 may be a volatile memory or a nonvolatile memory, or may include the volatile memory and the nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus may further include a power bus, a control bus, a status signal bus, and the like, in addition to a data bus. The bus may be a peripheral component interconnect express (peripheral component interconnect express, PCIe) bus, an extended industry standard architecture (extended industry standard architecture, EISA) bus, a unified bus (unified bus, Ubus, or UB), a compute express link (compute express link, CXL) bus, a cache coherent interconnect for accelerators (cache coherent interconnect for accelerators, CCIX) bus, or the like. Buses may be classified into a bus address, a data bus, a control bus, and the like.

It may be understood that the memory sharing apparatus 900 shown in FIG. 9 and the electronic device 1000 shown in FIG. 10 in embodiments of this application may be a host side, a first device side, or a second device side in the system architecture shown in FIG. 1a.

In another embodiment of this application, a computer-readable storage medium is further provided. The computer-readable storage medium stores a computer executable instruction. When a processor of a device executes the computer executable instruction, the device performs the method performed on the host side, the first device side, or the second device side in the foregoing method embodiment.

In another embodiment of this application, a computer program product is further provided. The computer program product includes computer executable instructions. The computer executable instructions are stored in a computer-readable storage medium. When a processor of a device executes the computer executable instructions, the device performs the method performed on the host side, a first device side, or a second device side in the foregoing method embodiment.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk drive, a read-only memory (Read-Only Memory, ROM), a random access memory (Random Access Memory, RAM), a magnetic disk, or an optical disc.

What is claimed is:

1. A memory sharing method, used in a heterogeneous system, wherein the heterogeneous system comprises a host side and a first device side, and the method comprises:
   establishing, by the host side, a first memory page table, wherein the first memory page table comprises mapping from a virtual address on the host side to a physical address on the host side;
   establishing, by the first device side, a second memory page table, wherein the second memory page table comprises mapping from a virtual address on the first device side to a physical address on the first device side, and the physical address on the host side and the physical address on the first device side are physical addresses obtained through unified addressing; and
   updating, by an agent system memory management unit (SMMU) on the first device side, the second memory page table based on the first memory page table, and updating, by the host side, the first memory page table based on the second memory page table.

2. The method according to claim 1, wherein the updating, by SMMU on the first device side, the second memory page table based on the first memory page table comprises:
   querying, by the agent SMMU on the first device side, the first memory page table based on a first virtual address, to obtain a first physical address, wherein the first virtual address is a virtual address to be accessed by the first device side, and the first physical address is a physical address on the host side; and
   adding, by the first device side, mapping from the first virtual address to the first physical address to the second memory page table.

3. The method according to claim 2, wherein after the adding, by the first device side, mapping from the first virtual address to the first physical address to the second memory page table, the method further comprises:

querying, by the first device side, the second memory page table based on the first virtual address, to obtain the first physical address; and accessing, by the first device side, a memory on the host side based on the first physical address.

4. The method according to claim 1, wherein the updating, by the host side, the first memory page table based on the second memory page table comprises:

querying, by the first device side, the second memory page table based on a second virtual address, to obtain a second physical address, wherein the second physical address is a physical address on the first device side; and adding, by the host side, mapping from the second virtual address to the second physical address to the first memory page table.

5. The method according to claim 4, wherein before the querying, by the first device side, the second memory page table based on the second virtual address, the method further comprises:

sending, by the host side, the second virtual address to the first device side, wherein the second virtual address comprises a virtual address allocated on the host side;

allocating, by the first device side, a physical memory to the second virtual address, to obtain the second physical address; and adding, by the first device side, the mapping from the second virtual address to the second physical address to the second memory page table.

6. The method according to claim 4, wherein after the adding, by the host side, mapping from the second virtual address to the second physical address to the first memory page table, the method further comprises:

querying, by the host side, the first memory page table based on the second virtual address, to obtain the second physical address; and accessing, by the host side, a memory on the first device side based on the second physical address.

7. The method according to claim 4, wherein the heterogeneous system further comprises a second device side, and after the adding, by the host side, mapping from the second virtual address to the second physical address to the first memory page table, the method further comprises:

updating, by an agent SMMU on the second device side, a third memory page table based on the first memory page table, wherein the first memory page table comprises the mapping from the second virtual address to the second physical address;

querying, by the second device side, the third memory page table based on the second virtual address, to obtain the second physical address; and accessing, by the second device side, a memory on the first device side based on the second physical address.

8. A memory sharing method, used in a heterogeneous system, wherein the heterogeneous system comprises a host side and a first device side, and the method comprises:

performing, by the host side, unified addressing on memory space of the heterogeneous system, to obtain a memory page table, wherein the memory page table comprises mapping from a virtual address to a physical address in the heterogeneous system;

the first device side accesses a first virtual address in the heterogeneous system by querying, by a system memory management unit (SMMU) on the first device side, the memory page table based on the first virtual address, to obtain a first physical address, wherein the first physical address comprises a physical address on the host side; and accessing, by the first device side, a memory on the host side based on the first physical address, wherein the querying by SMMU on the first device side, the memory page table based on the first virtual address comprises:

sending, by the SMMU on the first device side, the first virtual address to an agent SMMU on the first device side;

querying, by the agent SMMU on the first device side, the memory page table, to obtain the first physical address; and sending, by the agent SMMU on the first device side, the physical first physical address to the SMMU of a first device via a dispatch module.

9. The method according to claim 8, wherein after the performing, by the host side, unified addressing on memory space of the heterogeneous system, the method further comprises:

storing, by the host side, the memory page table on the first device side.

10. An electronic device, comprising a processor, wherein the processor is coupled to a storage, the processor is configured to store instructions, and when the instructions are executed by the processor, the electronic device is enabled to:

establish, by a host side, a first memory page table, wherein the first memory page table comprises mapping from a virtual address on the host side to a physical address on the host side;

establish, by a first device side, a second memory page table, wherein the second memory page table comprises mapping from a virtual address on the first device side to a physical address on the first device side, and the physical address on the host side and the physical address on the first device side are physical addresses obtained through unified addressing; and update, by an agent system memory management unit (SMMU) on the first device side, the second memory page table based on the first memory page table, and update, by the host side, the first memory page table based on the second memory page table.

11. The electronic device according to claim 10, wherein, the updating, by the agent SMMU on the first device side, the second memory page table based on the first memory page table comprises:

querying, by the agent SMMU on the first device side, the first memory page table based on a first virtual address, to obtain a first physical address, wherein the first virtual address is a virtual address to be accessed by the first device side, and the first physical address is a physical address on the host side; and adding, by the first device side, mapping from the first virtual address to the first physical address to the second memory page table.

12. The electronic device according to claim 11, wherein after the adding, by the first device side, mapping from the first virtual address to the first physical address to the second memory page table, the method further comprises:

querying, by the first device side, the second memory page table based on the first virtual address, to obtain the first physical address; and accessing, by the first device side, a memory on the host side based on the first physical address.

13. The electronic device according to claim 10, wherein the updating, by the host side, the first memory page table based on the second memory page table comprises:

querying, by the first device side, the second memory page table based on a second virtual address, to obtain a second physical address, wherein the second physical address is a physical address on the first device side; and adding, by the host side, mapping from the second virtual address to the second physical address to the first memory page table.

14. The electronic device according to claim 13, wherein before the querying, by the first device side, the second memory page table based on the second virtual address, the method further comprises:

sending, by the host side, the second virtual address to the first device side, wherein the second virtual address comprises a virtual address allocated on the host side;

allocating, by the first device side, a physical memory to the second virtual address, to obtain the second physical address; and adding, by the first device side, the mapping from the second virtual address to the second physical address to the second memory page table.

15. The electronic device according to claim 13, wherein after the adding, by the host side, mapping from the second virtual address to the second physical address to the first memory page table, the method further comprises:

querying, by the host side, the first memory page table based on the second virtual address, to obtain the second physical address; and accessing, by the host side, a memory on the first device side based on the second physical address.

16. The electronic device according to claim 13, wherein the heterogeneous system further comprises a second device side, and after the adding, by the host side, mapping from the second virtual address to the second physical address to the first memory page table, the method further comprises:

updating, by an agent SMMU on the second device side, a third memory page table based on the first memory page table, wherein the first memory page table comprises the mapping from the second virtual address to the second physical address;

querying, by the second device side, the third memory page table based on the second virtual address, to obtain the second physical address; and accessing, by the second device side, a memory on the first device side based on the second physical address.

* * * * *